(12) United States Patent
Shipton et al.

(10) Patent No.: US 10,845,538 B2
(45) Date of Patent: Nov. 24, 2020

(54) DIFFRACTION GRATINGS FOR BEAM REDIRECTION

(71) Applicant: Facebook Technologies, LLC, Menlo Park, CA (US)

(72) Inventors: Erik Shipton, Kenmore, WA (US); Bharath Bangalore Rajeeva, Austin, TX (US)

(73) Assignee: Facebook Technologies, LLC, Menlo Park, CA (US)

( * ) Notice: Subject to any disclaimer, the term of this patent is extended or adjusted under 35 U.S.C. 154(b) by 162 days.

(21) Appl. No.: 16/134,840

(22) Filed: Sep. 18, 2018

(65) Prior Publication Data

US 2019/0339449 A1    Nov. 7, 2019

Related U.S. Application Data

(63) Continuation of application No. 16/057,744, filed on Aug. 7, 2018.

(51) Int. Cl.
| | | |
|---|---|---|
| *G02B 6/122* | (2006.01) | |
| *G02B 27/09* | (2006.01) | |
| *G02B 27/01* | (2006.01) | |
| *G02B 27/10* | (2006.01) | |

(52) U.S. Cl.
CPC ......... *G02B 6/122* (2013.01); *G02B 27/0172* (2013.01); *G02B 27/0944* (2013.01); *G02B 27/1006* (2013.01)

(58) Field of Classification Search
CPC ............... G02B 6/122; G02B 27/0944; G02B 27/0172; G02B 27/1006; G02B 27/0081; G02B 27/4272; G02B 2027/0174; G02B 5/008; G02B 5/1819–1823; G02B 5/1866; G02B 6/02076–02209; G02B 1/002; B82Y 20/00; G03H 1/0248; G03H 2001/266

See application file for complete search history.

(56) References Cited

U.S. PATENT DOCUMENTS

| | | |
|---|---|---|
| 2006/0262250 A1 | 11/2006 | Hobbs |
| 2009/0303212 A1 | 12/2009 | Kkutsu et al. |
| 2015/0253570 A1* | 9/2015 | Sunnari ............... G02B 6/0035 359/576 |
| 2017/0023711 A1* | 1/2017 | Jiang .................... G02B 5/1809 |
| 2018/0143470 A1* | 5/2018 | Oh .......................... G02F 1/29 |
| 2018/0143586 A1 | 5/2018 | Narducci et al. |
| 2019/0025632 A1 | 1/2019 | Kuo et al. |

OTHER PUBLICATIONS

Arbabi et al. (Multiwavelength metasurfaces through spatial multiplexing, Scientific Reports 6:32803, pp. 1-8, 2016). (Year: 2016).*

* cited by examiner

*Primary Examiner* — Kimberly N. Kakalec
(74) *Attorney, Agent, or Firm* — Pequignot + Myers; Matthew A. Pequignot

(57) ABSTRACT

A diffraction grating with independently controlled diffraction angles for optical beams at different wavelengths may be used to redirect and couple light to a waveguide in an efficient, space-saving manner. The diffraction grating can include a layer with optical permittivity and associated index contrast of the grating grooves at different grating periods dependent on wavelength.

17 Claims, 18 Drawing Sheets

DIFFRACTION GRATINGS FOR BEAM REDIRECTION

REFERENCE TO RELATED APPLICATIONS

This application is a continuation application of, and claims priority from, U.S. patent application Ser. No. 16/057,744 filed on Aug. 7, 2018 entitled "Diffraction Gratings for Beam Redirection", and from U.S. Provisional Application No. 62/667,393 filed on May, 4, 2018 entitled "Diffraction Gratings for Beam Redirection". Both applications are incorporated herein by reference in their entireties for all purposes.

TECHNICAL FIELD

The present disclosure relates to optical components, and in particular to diffraction gratings suitable for redirecting optical beams, and modules and systems using such diffraction gratings.

BACKGROUND

Diffraction gratings are optical devices for separating light at different wavelengths by using the phenomenon of optical diffraction on a periodic or quasi-periodic grating structure. The angle of diffraction of light depends on the ratio of the wavelength of light to the period of the periodic or quasi-periodic grating structure, causing the diffraction grating to disperse an impinging multi-wavelength optical beam into a fan of sub-beams at different wavelengths. The wavelength separating property of diffraction gratings, in combination with high achievable diffraction efficiency and a relative ease of manufacture, resulted in their widespread use in spectrographs, lasers, wavelength-selective optical switches, tunable filters, and other devices.

Diffraction gratings may be used as anamorphic optical elements for space-efficient redirection of optical beams. The use of diffraction gratings for beam redirection is attractive because a diffraction grating can be constructed to efficiently redirect the beam at oblique angles with respect to the plane of the diffraction grating, saving space by suitable placement of the diffraction gratings parallel to available substrates, and compressing circular beams into beams having an elliptical cross section for propagation in thin and narrow waveguide structures. However, the beam redirecting and coupling of multi-colored beams is hindered by dependence of the angle of diffraction on wavelength, resulting in spatial separation of wavelength sub-beams of a multi-wavelength optical beam.

BRIEF DESCRIPTION OF THE DRAWINGS

Exemplary embodiments will now be described in conjunction with the drawings, in which.

DETAILED DESCRIPTION

Figure 1A:
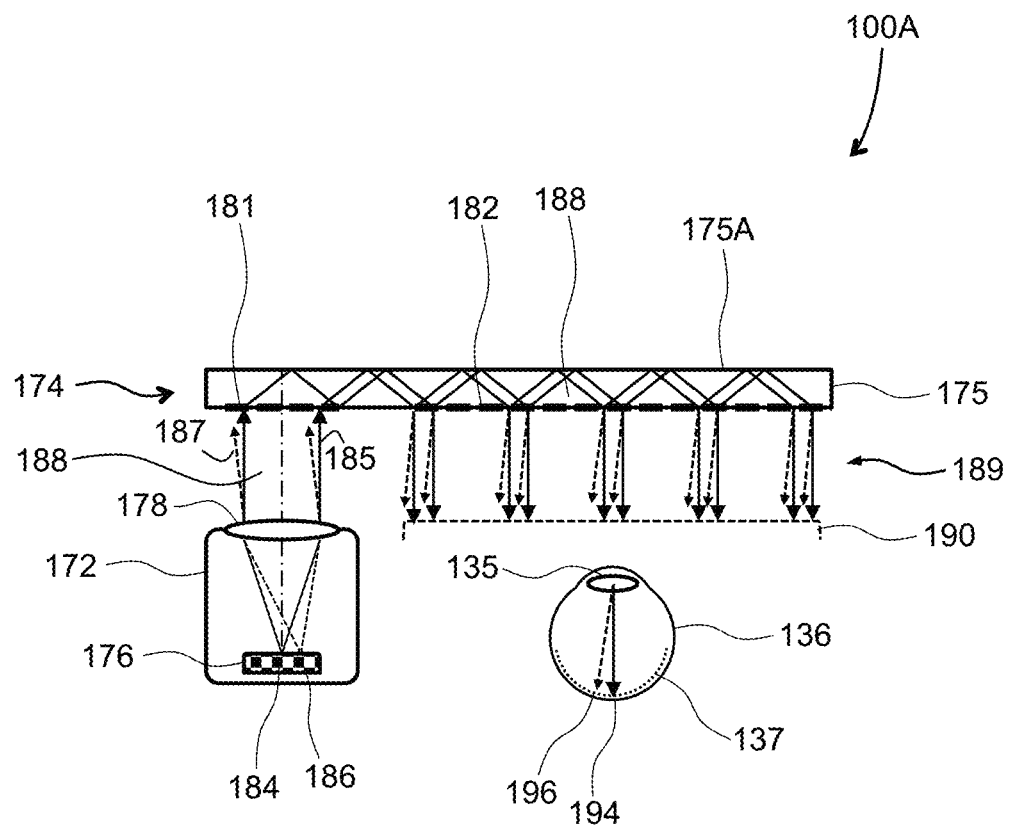
FIG. 1A is a side cross-sectional view of an optics block of a near-eye display using diffraction gratings for pupil replication according to an embodiment of the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

The dependence of an output beam angle of a diffraction grating on wavelength occurs exactly due to the property of diffraction gratings they are typically used for, i.e. the wavelength separation and dispersion property. When a multi-color beam, e.g. a white light beam, is diffracted, it is spread into individual wavelength components, each having its own direction of propagation, which may be undesirable in multi-wavelength beam steering and coupling applications.

In accordance with the disclosure, a diffraction grating may be constructed such that diffraction angles of different color components can be individually controlled. For example, sub-beams at wavelengths corresponding to red, green, and blue color channels of a visual display can be made to diffract at a same angle, enabling efficient guiding of a white-light beam through a compact optical system substantially without dispersing the white-light beam into individual color sub-beams.

In accordance with the present disclosure, there is provided a diffraction grating comprising first and second grating structures. The first grating structure has a first spatial variation of optical permittivity. The first spatial variation has a first grating pitch and a wavelength-dependent first amplitude, such that at a first wavelength, the first amplitude is above a first threshold and at a second wavelength, the first amplitude is below a second threshold. The second grating structure has a second spatial variation of optical permittivity. The second spatial variation has a second grating pitch and a wavelength-dependent second amplitude, such that at the first wavelength, the second amplitude is below the second threshold and at the second wavelength, the second amplitude is above the first threshold. The second threshold is lower than the first threshold, e.g. below 10% of the first threshold, below 1% of the first threshold, or even close to zero.

In accordance with the present disclosure, there is further provided an optical waveguide for a near-eye display. The optical waveguide includes a slab of transparent material and the first and second grating structures described above. The first grating structure may be supported by the slab, and the second grating structure may be supported by the first grating structure.

The optical permittivity of the first grating structure can include a spatially varying refractive index having a wavelength-dependent first refractive index contrast, and the optical permittivity of the second grating structure can include a spatially varying refractive index having a wavelength-dependent second refractive index contrast. In other words, the grating structures of the diffraction grating and/or the optical waveguide may be purely refractive, each being characterized by a wavelength-dependent refractive index contrast. The first refractive index contrast may be above the first threshold at the first wavelength and below the second threshold at the second wavelength. The second refractive index contrast may be below the second threshold at the first wavelength and above the first threshold at the second wavelength. In some embodiments, the first refractive index contrast can be substantially zero at the second wavelength, and the second refractive index contrast can be substantially zero at the first wavelength.

A third grating structure may be provided for the above optical devices. The third grating structure may have a third spatial variation of optical permittivity. The third spatial variation may have a third grating pitch and a wavelength-dependent third amplitude, such that at the first and second wavelengths, the third amplitude is below the second threshold and at a third wavelength, the third amplitude is above the first threshold. In this embodiment, at the third wavelength, the first amplitude and the second amplitude are both below the second threshold. Each one of the first, second, and third wavelengths may correspond to a color channel of an electronic display. Ratios of the first grating pitch to the first wavelength; the second grating pitch to the second wavelength; and the third grating pitch to the third wavelength may be selected to be equal to each other, such that in operation, components of an optical beam at the first, second, and third wavelengths emitted by the electronic display and impinging on the diffraction grating are diffracted at a substantially same diffraction angle. The first and second grating structures may be disposed adjacent one another, e.g. on top of one another.

In some embodiments, the first grating structure may include a plurality of first nanoparticles at a first spatially varying density of nanoparticles, the first nanoparticles having a surface plasmon resonance at the first wavelength. The second grating structure may include a plurality of second nanoparticles at a second spatially varying density of nanoparticles, the second nanoparticles having a surface plasmon resonance at the second wavelength. The first nanoparticles may include metal spheres of a first diameter, and the second nanoparticles may include metal spheres of a second diameter. Metal-semiconductor or metal-dielectric core shells, or both, of same or different diameters and diameter ratios, may also be used for the first and second nanoparticles. The third grating structure may include a plurality of third nanoparticles at a third spatially varying density of nanoparticles, the third nanoparticles having a surface plasmon resonance at a third wavelength. Each one of the first, second, and third wavelengths may correspond to a color channel of an electronic display.

In some embodiments, the plurality of first nanoparticles comprises an array of first stripes of nanoparticles at the first grating pitch, the plurality of second nanoparticles comprises an array of second stripes of nanoparticles at the second grating pitch, and the plurality of third nanoparticles comprises an array of third stripes of nanoparticles at the third grating pitch. Ratios of the first grating pitch to the first wavelength; the second grating pitch to the second wavelength; and the third grating pitch to the third wavelength may be selected to be equal to each other to make sure that components of an optical beam at the first, second, and third wavelengths emitted by the electronic display and impinging on the diffraction grating are diffracted at a substantially same diffraction angle. Furthermore, each stripe can include a sub-array of nanoparticles.

In some embodiments, the first grating structure includes a first hyperbolic metamaterial comprising an array of first stripes at the first grating pitch and having a zero refractive index contrast at the second wavelength, and the second grating structure comprises a second hyperbolic metamaterial comprising an array of second stripes at the second grating pitch and having a zero refractive index contrast at the first wavelength. Each first stripe may include a stack of alternating metal and semiconductor layers having a first set of thicknesses to provide a zero refractive index contrast at the second wavelength, and each second stripe may include a stack of alternating metal and semiconductor layers having a second set of thicknesses to provide a zero refractive index contrast at the first wavelength. A stack of alternating metal and dielectric layers may also be used for any of the grating structures. A ratio of the first to second grating pitches may be selected to be equal to a ratio of the first to second wavelengths, such that in operation, components of an optical beam at the first and second wavelengths impinging on the diffraction grating are diffracted at a substantially same diffraction angle.

In accordance with the present disclosure, there is further provided a diffraction grating comprising a layer of material with a spatially varying optical permittivity dependent on wavelength, such that at a first wavelength, the spatially varying optical permittivity comprises a plurality of peaks and valleys at a first pitch, and at a second, different wavelength, the spatially varying optical permittivity comprises a plurality of peaks and valleys at a second, different pitch.

In accordance with the present disclosure, there is further provided an optical waveguide for a near-eye display. The optical waveguide may include a slab of transparent material and a diffraction grating supported by the slab. The diffraction grating may include a layer of material having a spatially varying optical permittivity dependent on wavelength, such that at a first wavelength, the spatially varying optical permittivity comprises a plurality of peaks and valleys at a first pitch, and at a second, different wavelength, the spatially varying optical permittivity comprises a plurality of peaks and valleys at a second, different pitch.

The spatially varying optical permittivity may include a spatially varying refractive index. A ratio of the first to second pitches may be selected to be equal to a ratio of the first to second wavelengths, such that in operation, components of an optical beam at the first and second wavelengths impinging on the diffraction grating are diffracted at a substantially same diffraction angle.

The material of the diffraction grating may include a plurality of first nanoparticles at a first spatially varying density, the first nanoparticles having a surface plasmon resonance at the first wavelength; and a plurality of second nanoparticles at a second spatially varying density, the second nanoparticles having a surface plasmon resonance at the second wavelength.

The material may also include a hyperbolic metamaterial including an array of first stripes at the first pitch and having a zero refractive index contrast at the second wavelength, and an array of second stripes at the second pitch and having a zero refractive index contrast at the first wavelength. Each first stripe may include a stack of alternating metal and semiconductor or dielectric layers having a first set of thicknesses to provide a zero refractive index contrast at the second wavelength. Each second stripe may include a stack of alternating metal and semiconductor or dielectric layers having a second set of thicknesses to provide a zero refractive index contrast at the first wavelength. A ratio of the first to second pitches may be selected to be equal to a ratio of the first to second wavelengths; in this configuration, components of an optical beam at the first and second wavelengths impinging on the diffraction grating are diffracted at a substantially same diffraction angle.

In accordance with the present disclosure, there is further provided a near-eye display comprising an electronic display for providing image light comprising first and second color channels, and an optical waveguide configured to receive and guide therein the image light from the electronic display. The optical waveguide may be any of the optical waveguides described above. In one embodiment, the optical waveguide includes a slab of transparent material. A first diffraction grating is supported by the slab and is configured for receiving the image light from the electronic display for in-coupling to the slab. A second diffraction grating is supported by the slab and is configured for receiving the image light from the first diffraction grating through the slab for out-coupling the light from the slab. At least one of the first and second diffraction gratings comprises a layer of material having a spatially varying optical permittivity dependent on wavelength, such that at a first wavelength of the first color channel, the spatially varying optical permittivity comprises a plurality of peaks and valleys at a first pitch; and at a second wavelength of the second color channel, the spatially varying optical permittivity comprises a plurality of peaks and valleys at a second, different pitch. A ratio of the first to second pitches may be selected to be equal to a ratio of the first to second wavelengths, to make sure that the first and second color channels of image light at the first and second wavelengths impinging on the first diffraction grating are diffracted at a substantially same angle for joint propagation in the slab, and the first and second color channels of image light at the first and second wavelengths impinging on the second diffraction grating are diffracted at a substantially same angle for joint propagation towards an eye of a user.

Referring now to FIG. 1A, an optics block 100A of a near-eye display of the present disclosure includes a projector 172 and a pupil-replicating waveguide 174. The projector 172 includes an electronic display 176 and collimating optics represented by a lens 178. The pupil-replicating waveguide 174 includes a plano-parallel slab 175 of a transparent material, an in-coupling diffraction grating 181 supported by the slab 175, and an out-coupling diffraction grating 182 supported by the slab 175. The in-coupling 181 and out-coupling 182 diffraction gratings are shown in FIG. 1A with thick dashed lines. In operation, an image is displayed by the electronic display 176. The lens 178 can be disposed one focal length away from the electronic display 176. The lens 178 transforms a diverging light cone emitted by a center pixel 184 of the electronic display 176 into a collimated or nearly-collimated on-axis optical beam 185 shown with solid arrows. The lens 178 also transforms a diverging light cone emitted by a side pixel 186 of the electronic display 176 into a collimated off-axis optical beam 187 shown with dashed arrows. Thus, a coordinate of a light-emitting pixel of the electronic display 176 is transformed by the lens 178 into an angle of a corresponding collimated or nearly-collimated optical beam. In other words, a combined optical beam 188 carries the image displayed by the electronic display 176 in angular domain.

The function of the pupil-replicating waveguide 174 will now be explained. The in-coupling diffraction grating 181 receives the combined optical beam 188 and diffracts the combined optical beam 188 for propagation in the slab 175 in a zigzag pattern as shown. The direction of the zigzag propagation of the combined optical beam 188 in the slab 175 is from left to right in FIG. 1A. The out-coupling diffraction grating 182 receives the combined optical beam 188 from the plano-parallel slab 175 and outputs a portion of that beam towards a user's eye 136. A portion of the remaining light is reflected by the out-coupling diffraction grating 182 to be output at a downstream location. The combined optical beam 188 is directed towards an upper surface 175A of the slab 175, is reflected from the upper surface 175A, e.g. totally internally reflected, and impinges on the out-coupling diffraction grating 182 again at a different location, which is offset to the right in FIG. 1A. Then the process of reflection and diffraction repeats, effectively expanding the combined optical beam 188 over an area of an eyebox 190, while preserving the angular image information as shown by downward-looking arrows 189. In other words, this multiple reflection-diffraction process replicates the output pupil of the optics block 100A. This makes the eyebox 190 larger than the user's eye 136, allowing a degree of movement and rotation of the user's eye 136, and also accommodating for a different disposition of the near-eye display with respect to eyes of different users, as well for a different inter-pupil distance (IPD) of different users.

Cornea and lens 135 of the user's eye 136 focus the light onto a retina 137 of the user's eye 136, transforming the beam angle back into a beam coordinate on the retina 137, thereby forming an image 196 of the side pixel 186 of the electronic display 176 at a different location of the retina 137 than an image 194 of the center pixel 184, and essentially transferring the image displayed by the electronic display 176 onto the retina 137 of the user's eye 136.

The optics block 100A is compact and has a small number of optical elements, making it lightweight and suitable for a near-eye display having a form factor of a pair of eyeglasses. However, it can only work in a limited wavelength band, and/or in a limited angular viewing range or gaze range. This happens because in a regular diffraction grating, the diffraction angle depends on the wavelength of impinging light, and for wavelengths outside of a certain wavelength band, the diffraction angles become too small or too large for the pupil-replicating waveguide 174 to work properly. The present disclosure seeks to expand the viewing angle, the wavelength band, or both, of a display system by providing a diffraction grating, in which the diffraction angles can be individually controlled for different color channels and/or different wavelengths. This can expand the available design space, allowing one to reduce the display size, weight, and/or to increase the viewing angle and color range, fidelity, and uniformity. It is to be understood however that the disclosure is not limited to display systems only; the diffraction gratings described herein may be used in a broad variety of optical devices requiring optical beam redirection and routing. The pupil-replicating waveguide 174 is just a non-limiting, illustrative example of an optical module or system where the diffraction gratings of the present disclosure can be advantageously used.

Figure 1B:
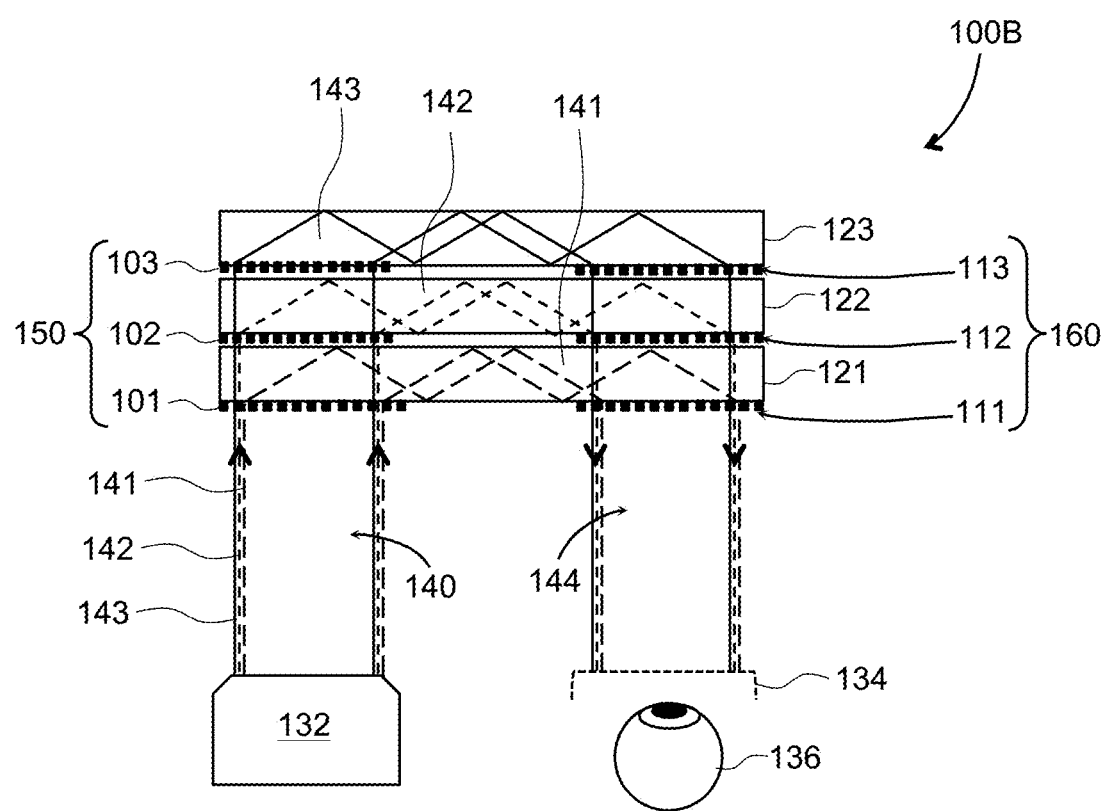
FIG. 1B is a side cross-sectional view of an optics block of a near-eye display including three grating structures and three waveguides for three color channels, according to an embodiment of the present disclosure.

Turning to FIG. 1B, an optics block 100B has not one but three stacked pupil-replicating waveguides, which are similar to the pupil-replicating waveguide 174 of FIG. 1A. The optics block 100B includes first in-coupling 101 and out-coupling 111 grating structures supported by a first transparent slab 121, second in-coupling 102 and out-coupling 112 grating structures supported by a second transparent slab 122, and third in-coupling 103 and out-coupling 113 grating structures supported by a third transparent slab 123. The slabs 121, 122, and 123 are arranged in a stack configuration as shown. A projector 132, similar to the projector 172 of FIG. 1A, provides an input beam 140 including red (R) 141, green (G) 142, and blue (B) 143 color channels, each at its own corresponding center wavelength. The R color channel 141 is shown with solid lines; the G color channel 142 is shown with short-dash lines; and the B color channel 143 is shown with long-dash lines. The in-coupling 101, 102, 103 and out-coupling 111, 112, 113 grating structures are configured to couple the R 141, G 142, and B 143 color channels in and out of the respective slabs 121, 122, and 123 such that only one color channel propagates in a corresponding slab 121, 122, and 123. In other words, the R color channel 141 propagates only or predominantly in the first slab 121, the G color channel 142 propagates only or predominantly in the second slab 122, and the B color channel 143 propagates only or predominantly in the third slab 123. To that end, the in-coupling 101, 102, 103 and out-coupling 111, 112, 113 diffraction grating structures are configured to merely pass through the other color channels, substantially without diffraction, i.e. without beam splitting or redirection. Since only one color channel propagates in any given slab 121, 122, and 123, the overall viewing angle and wavelength performance of the optics block 100B can be improved. An output beam 144, including the combined color channels 141, 142, and 143, propagates towards an eyebox 134. At least two pupil-replicating waveguides including corresponding slabs and gratings, but more commonly three waveguides, one for each color channel, may be provided.

Various configurations of diffraction gratings, which diffract light at only one wavelength or at only one color channel, while propagating through the remaining color channels, will now be described. Initially, it is noted that grooves of a diffractive structure can be represented by spatial oscillations of optical permittivity, i.e. permittivity at optical frequencies, of a medium, such as thin layer of a material for a thin diffraction grating. The optical permittivity spatially oscillates with a certain pitch, i.e. a spatial period of oscillation, which can be constant or varying. In accordance with the present disclosure, the amplitude of such spatial variation at a certain pitch, i.e. the amplitude of spatial oscillation of optical permittivity at a given pitch, can be made wavelength-dependent; furthermore, for different grating pitches, the wavelength dependence of the amplitude is different. For example, the in-coupling 101, 102, 103 and out-coupling 111, 112, 113 grating structures can have wavelength-dependent amplitudes of spatial variations of optical permittivity at generally different values of grating pitch for diffracting light at different wavelengths.

Figure 2A:
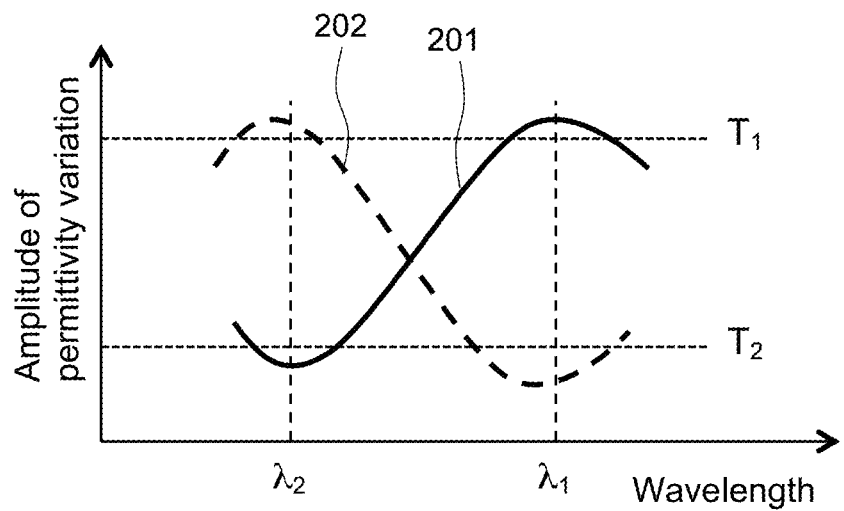
FIG. 2A is a schematic diagram showing a wavelength dependence of amplitudes of spatial variation of optical permittivity corresponding to grooves of two diffraction grating structures in accordance with the present disclosure.

The latter point is illustrated in FIG. 2A. A first amplitude 201 of a spatial variation of optical permittivity of the first in-coupling 101 and out-coupling 111 grating structures (FIG. 1B) at a first grating pitch is above a first threshold $T_1$ (FIG. 2A) at a first wavelength $\lambda_1$, and is below a second threshold $T_2$ at a second wavelength $\lambda_2$. A second amplitude 202 of a spatial variation of optical permittivity of the second in-coupling 102 and out-coupling 112 grating structures at a second grating pitch is below the first threshold $T_1$ at the first wavelength $\lambda_1$, and is above the second threshold $T_2$ at the second wavelength $\lambda_2$. In this manner, the first in-coupling 101 and out-coupling 111 grating structures can be made to predominantly diffract light at the first wavelength $\lambda_1$, and the second in-coupling 102 and out-coupling 112 grating structures can be made to predominantly diffract light at the second wavelength $\lambda_2$. The different first and second grating pitches enable independent diffraction angle control for different wavelengths. Herein, the first wavelength $\lambda_1$ may correspond to the center wavelength of the R channel, and the second wavelength $\lambda_2$ may correspond to the center wavelength of the G channel. More generally, the first $\lambda_1$ and second $\lambda_2$ wavelengths can be any two different optical wavelengths, i.e. wavelengths of visible light corresponding to different color channels of an electronic display, for an AR/VR display application.

For visual display systems with three color channels, a third amplitude 203 (FIG. 2B) of a spatial variation of optical permittivity of the third in-coupling 103 and out-coupling 113 grating structures at a third grating pitch is above the first threshold $T_1$ at a third wavelength $\lambda_3$ corresponding to the blue (B) channel while being below the second threshold $T_2$ at the first $\lambda_1$ and second $\lambda_2$ wavelengths. In such a system, at the third wavelength $\lambda_3$, the first amplitude 101 and the second amplitude 102 are both below the second threshold $T_2$.

Figure 2B:
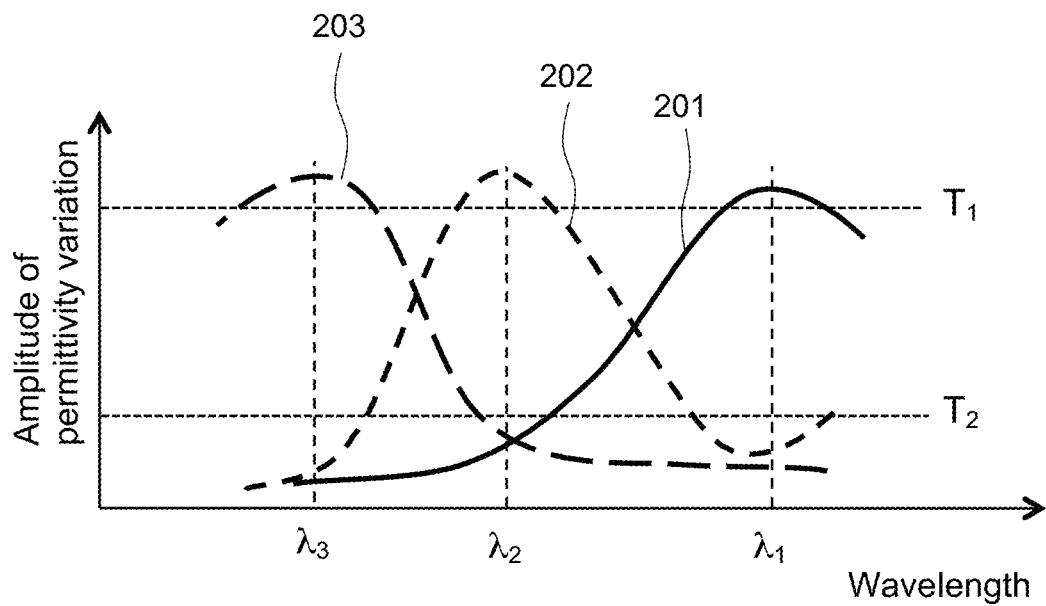
FIG. 2B is a schematic diagram showing a wavelength dependence of amplitudes of spatial variation of optical permittivity corresponding to grooves of three diffraction grating structures in accordance with the present disclosure.

In FIGS. 2A and 2B, the second threshold $T_2$ is lower than the first threshold $T_1$. The ratio $T_2/T_1$ of two thresholds will determine the leakage of light at "wrong" wavelength into a downstream diffractive grating structure. It is generally desirable to decrease the $T_2/T_1$ ratio, which depends on the manufacturing technology of the diffractive grating structures with wavelength-dependent amplitude of permittivity variation. The $T_2/T_1$ ratio can be below 10%, for example. It is preferable to have the $T_2/T_1$ ratio of less than 1%, or even lower, e.g. less than 0.5% to reduce the formation of ghost images, which may be easily picked by an eye, especially when the ghost images are in-focus. It is further noted that the optical permittivity can be a complex number including a real part corresponding to the refractive index, and an imaginary part corresponding to the absorption coefficient. Herein, the term "amplitude of permittivity" refers to the amplitude of refractive index, the absorption coefficient, or more generally to a modulus of a complex optical permittivity, i.e. a square root of the sum of refractive index squared and the absorption coefficient squared. It is further noted that for the case where optical permittivity is a real number, the amplitude of spatial variation of permittivity corresponds to a value known as refractive index contrast, or simply index contrast, of a diffraction grating structure at a certain pitch. For such purely refractive grating structures, the first refractive index contrast at the first wavelength $\lambda_1$ is above the first threshold $T_1$ and at the second wavelength $\lambda_2$, the first refractive index contrast is below the second threshold $T_2$. At the first wavelength $\lambda_1$, the second refractive index contrast is below the second threshold $T_2$ and at the second wavelength $\lambda_2$, the second refractive index contrast is above the first threshold $T_1$. The third index contrast can also follow this rule, i.e. it is higher than the first threshold $T_1$ at the third wavelength $\lambda_3$, but lower than the second threshold $T_2$ at the two remaining wavelengths $\lambda_1$ and $\lambda_2$.

Figure 2C:
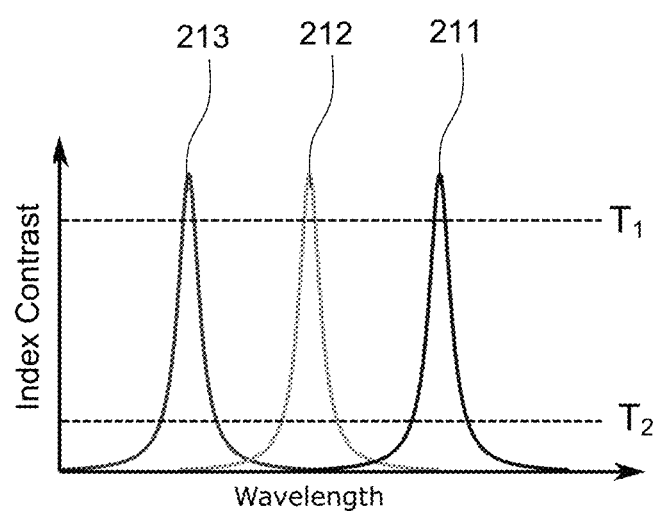
FIG. 2C is a spectral plot of refractive index contrast of the three grating structures of FIG. 1B, according to one embodiment.

A refractive index contrast spectrum of a purely refractive diffraction grating of the present disclosure is illustrated in FIG. 2C. The first in-coupling 101 and out-coupling 111 grating structures have a wavelength-dependent index contrast 211; the second in-coupling 102 and out-coupling 112 grating structures have a wavelength-dependent index contrast 212; and the third in-coupling 103 and out-coupling 113 grating structures have a wavelength-dependent index contrast 213. The first index contrast 211 peaks at the wavelength of the first (R) color channel and is substantially zero at the second (G) and third (B) channel wavelengths; the second index contrast 212 peaks at the second (G) channel wavelength and is substantially zero at the first (R) and third (B) channel wavelengths; and the third index contrast 213 peaks at the third (B) channel wavelength and is substantially zero at the first (R) and third (B) channel wavelengths. As a result, the first in-coupling 101 and out-coupling 111 grating structures are substantially transparent, i.e. invisible, for light at the G and B channel wavelengths; the second in-coupling 102 and out-coupling 112 grating structures are substantially transparent for the R and B channel wavelengths; and the third in-coupling 103 and out-coupling 113 grating structures are substantially transparent for the R and G channel wavelengths, causing each color channel to travel strictly in the slab it is assigned to. In other words, the R color channel 141 travels only in the first slab 121, the G color channel 142 travels only in the second slab 122, and the B color channel 143 travels only in the third slab 123.

Figure 3A:
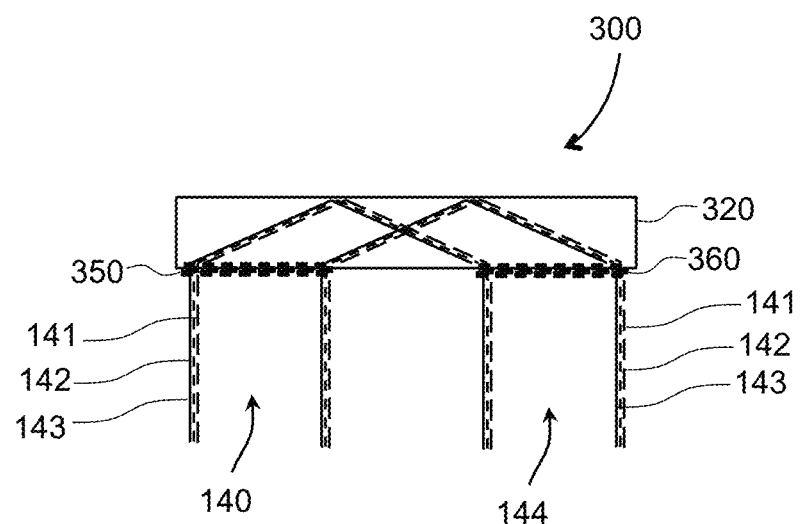
FIG. 3A is a side cross-sectional view of an optics block for a near-eye display including three adjacent grating structures and one common transparent slab, according to an embodiment of the disclosure.
Figure 3B:
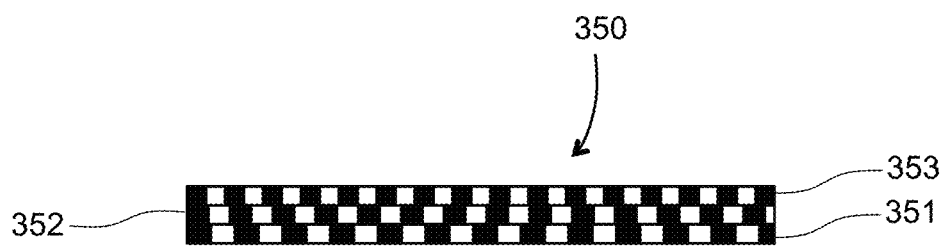
FIG. 3B is a magnified view of the adjacent grating structures of FIG. 3A.

The in-coupling grating structures 101, 102, and 103 may be considered as components of a compound in-coupling diffraction grating 150 (FIG. 1B), and the out-coupling grating structures 111, 112, and 113 may be considered as components of a compound out-coupling diffraction grating 160. In one embodiment, the in-coupling grating structures 101, 102, and 103 can be combined on a single substrate, and the out-coupling structures 111, 112, and 113 may be combined on a same or different substrate. Referring to FIG. 3A, an optics block 300 for a near-eye display (NED) or a head-mounted display (HMD) includes an in-coupling diffraction grating 350 and an out-coupling diffraction grating 360, both supported by a slab 320. Turning to FIG. 3B, the in-coupling grating 350 includes a first grating structure 351 for R channel; a second grating structure 352 for G channel; and a third grating structure 353 for B channel. The grating structures 351-353 are disposed adjacent one another, and may be directly disposed on top of one another. Each grating structure has its own pitch d. The diffraction equation for the first order of diffraction may be written down as $$\sin \theta = n(\lambda/d) \quad (1)$$

where $\theta$ is the angle of diffraction, $\lambda$ is wavelength, and n is refractive index of the surrounding medium. It follows from Eq. (1) that when the ratio of pitches of the grating structures 351, 352, and 353 is equal to the ratio of wavelengths of corresponding R 141, G 142, and B 143 color channels, the diffraction of all color components of the impinging optical beam 140 will occur at substantially the same angle, enabling the in-coupling grating 350 to redirect the R 141, G 142, and B 143 color channels substantially in a same direction. In other words, the in-coupling grating 350 can redirect the impinging optical beam 140 at a desired angle, i.e. a shallow angle as needed, substantially without color separation or color dispersion. The out-coupling grating 360 may be constructed in a similar manner. The in-coupling 350 and out-coupling 360 gratings may be purely refractive as illustrated in FIG. 2C, or more generally they may have complex optical permittivities as illustrated in FIGS. 2A and 2B. It is further noted that the in-coupling 350 and out-coupling 360 gratings may be used in place of the corresponding gratings 181 and 182 of the optics block 100A of FIG. 1A, resulting in an improvement of wavelength range, viewing angle range, or both, of the optics block 100A.

Figure 4:
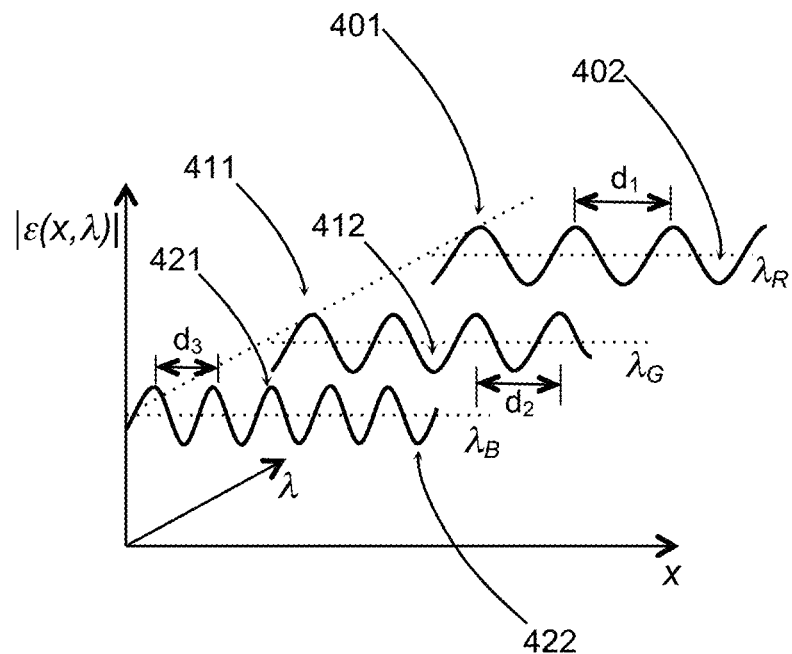
FIG. 4 is a three-dimensional plot of optical permittivity of a diffraction grating material as a function of wavelength and x-coordinate, showing a spatially varying optical permittivity having amplitude and period of the spatial variation dependent on wavelength.

In accordance with one aspect of the present disclosure, a diffraction grating for beam coupling, redirecting, and/or compressing a circular spot beam into an elliptical-spot beam can include materials with a spatially varying optical permittivity dependent on wavelength in such a manner that the grating structures 351, 352, and 353 are implemented in a same layer of material, resulting in a novel diffraction grating with unique properties. Referring to FIG. 4, a desired optical permittivity $\varepsilon(\lambda,x)$ is illustrated in a 3D spectral-spatial diagram. At a first wavelength, e.g. the center wavelength $\lambda_R$ of R color channel, the spatially varying optical permittivity modulus $|\varepsilon(\lambda,x)|$ comprises a plurality of peaks 401 and valleys 402 at a first pitch $d_1$. At a second, different wavelength, e.g. the center wavelength $\lambda_G$ of G color channel, the spatially varying optical permittivity $|\varepsilon(\lambda,x)|$ comprises a plurality of peaks 411 and valleys 412 at a second, different pitch $d_2$. Optionally, at a third, different wavelength, e.g. the center wavelength of B color channel, the spatially varying optical permittivity $|\varepsilon(\lambda,x)|$ comprises a plurality of peaks 421 and valleys 422 at a third, different pitch $d_3$. This allows one to independently control the diffraction angles at different wavelengths, in a similar manner as the compound in-coupling 350 and out-coupling 360 diffraction gratings described above, only in this case, it is a same optical medium that has optical properties of a stack of three different gratings. For example, when the ratio of pitches $d_1/d_2/d_3$ is equal to the ratio of center wavelengths of corresponding R, G, B color channels $\lambda_R/\lambda_G/\lambda_B$, the diffraction of all color components of an impinging optical beam 500 (FIG. 5) will occur at the same angle θ, enabling the diffraction grating to redirect the R 501, G 502, and B 503 channels sub-beams in a same direction. While the magnitude of the spatially varying optical permittivity $\varepsilon(\lambda,x)$ depends on implementation technologies and materials used, it may be advantageous to use optically transparent materials with purely real optical permittivity $\varepsilon(\lambda,x)$, i.e. where the spatially varying optical permittivity $\varepsilon(\lambda,x)$ is dominated by a spatially varying refractive index. Such gratings are not absorptive and may have a higher overall diffraction efficiency.

Figure 6A:
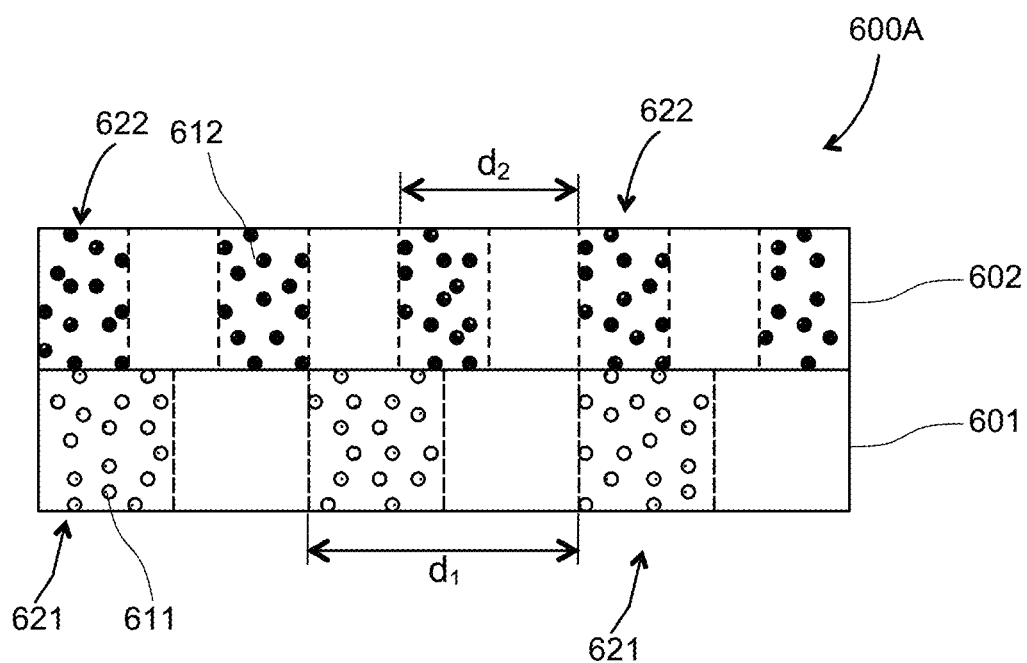
FIG. 6A is a side cross-sectional view of a diffraction grating comprising two distinct layers with embedded nanoparticles having distinct surface plasmon resonances.

Non-limiting examples of implementations of the above described diffraction gratings will now be considered. Referring to FIG. 6A, a diffraction grating 600A includes first 601 and second 602 grating structures. The first grating structure 601 includes a plurality of first embedded nanoparticles 611 at a first spatially varying density, e.g. in blocks 621 at a first pitch $d_1$, as shown. The first nanoparticles 611 (shown as white spheres) have a surface plasmon resonance at the first wavelength, e.g. the center wavelength of the R channel $\lambda_R$. A surface plasmon resonance occurs when the frequency of the external optical field is close to a resonant frequency of surface plasmon waves, i.e. surface electromagnetic waves, of a nanoparticle, causing the nanoparticle to act as a resonant nanoantenna for electromagnetic radiation at light frequencies. This antenna resonance effect results in a significant enhancement of the light absorption and emission cross-section of the nanoparticle. As in case of a regular antenna, the resonant frequency depends on the antenna size and shape, enabling fine tuning of such resonance. The first 611 and second 612 nanoparticles may be spherical, ellipsoidal, rod-like, etc.

The second grating structure 602 includes a plurality of second embedded nanoparticles 612 at a second spatially varying density, e.g. in blocks 622 at a second, different pitch $d_2$, as shown. The second nanoparticles 612 (shown as black spheres) have a surface plasmon resonance at the second, different wavelength, e.g. the center wavelength of the G channel $\lambda_G$ of an electronic display. To that end, the first 611 and second 612 nanoparticles may have different outer diameters (for spherical particles), may be of different materials such as gold (Au) and silver (Ag), may include a core made of a different material such as semiconductor or dielectric, etc. The latter configuration is termed herein a "core shell" nanoparticle configuration. The core shell nanoparticles may also be of different diameters and core-shell fill ratios. For example, the first nanoparticles may include metal-semiconductor core shells of a first diameter, and the second nanoparticles may include metal-semiconductor core shells of a second diameter. Alternatively, the first nanoparticles may include metal-dielectric core shells of a first diameter, and the second nanoparticles may include metal-dielectric core shells of a second diameter. A third grating structure for B channel may also be provided with third nanoparticles varying by diameters, composition, fill ratios, and the like.

Figure 6B:
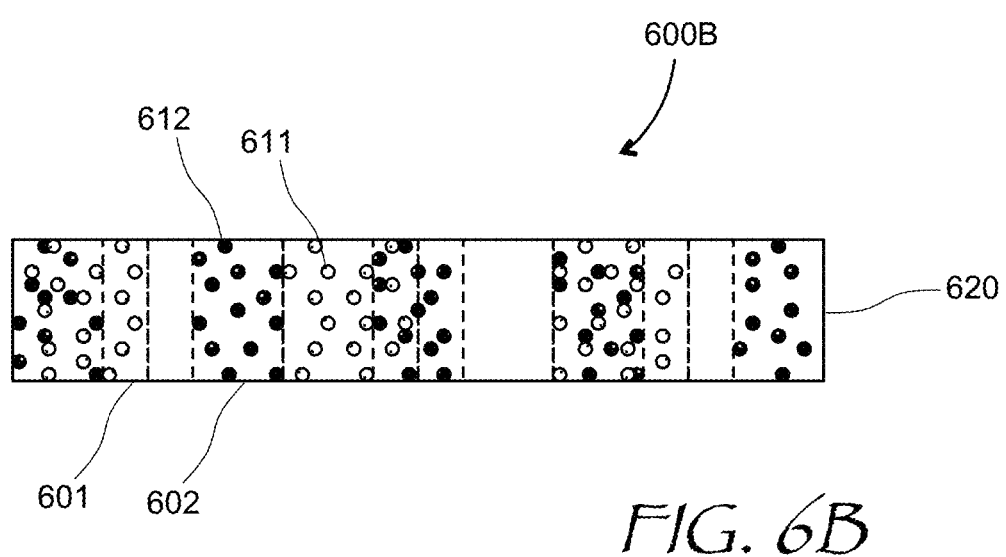
FIG. 6B is a side cross-sectional view of a diffraction grating comprising a single layer of material with embedded nanoparticles having distinct surface plasmon resonances.

In operation, the first nanoparticles 611 scatter light at the R channel wavelengths due to the surface plasmon resonance, while the scattering at the G and B channel wavelengths is zero or negligibly small. Since the nanoparticles are disposed in blocks 621, 622 having a grating-like configuration, together they act as lines of a diffraction grating, causing a diffraction of the R channel at a pre-determined angle defined by the grating equation (1) above, while being substantially transparent and/or non-diffracting for the G and B channels. Similarly, the second nanoparticles 612 only scatter and diffract light of the G channel; and the third nanoparticles only scatter and diffract light of the B channel of an electronic display. By way of a non-limiting example, the diffraction grating 600A may be used for the in-coupling grating 350 of FIGS. 3A, 3B and/or the out-coupling grating 360 of FIG. 3A. In FIG. 6B, a diffraction grating 600B includes first 601 and second 602 grating structures superimposed in a common layer 620, i.e. the first 611 and second 612 nanoparticles are embedded in the same layer 620. In this embodiment, the first grating structure 601 includes an array of first stripes of the first nanoparticles 611 at the first grating pitch, the and the second grating structure 602 includes an array of second stripes of nanoparticles 612 at the second, different grating pitch. Similarly, a third grating structure, omitted for brevity in FIG. 6B, may include an array of third stripes of nanoparticles at the third grating pitch, and so on. When different nanoparticles are embedded in a same layer, the resulting optical permittivity may have a multi-wavelength resonance. In other words, at one wavelength, the spatially varying optical permittivity $\varepsilon(\lambda,x)$ comprises a plurality of peaks and valleys at a first pitch, and at another, different wavelength, the spatially varying optical permittivity $\varepsilon(\lambda,x)$ comprises a plurality of peaks and valleys at a second, different pitch, and so forth. This multi-wavelength, spatially varying permittivity $\varepsilon(\lambda,x)$ has been illustrated in FIG. 4 for three center wavelengths of three color channels: red (R), green (G), and blue (B).

Figure 6C:
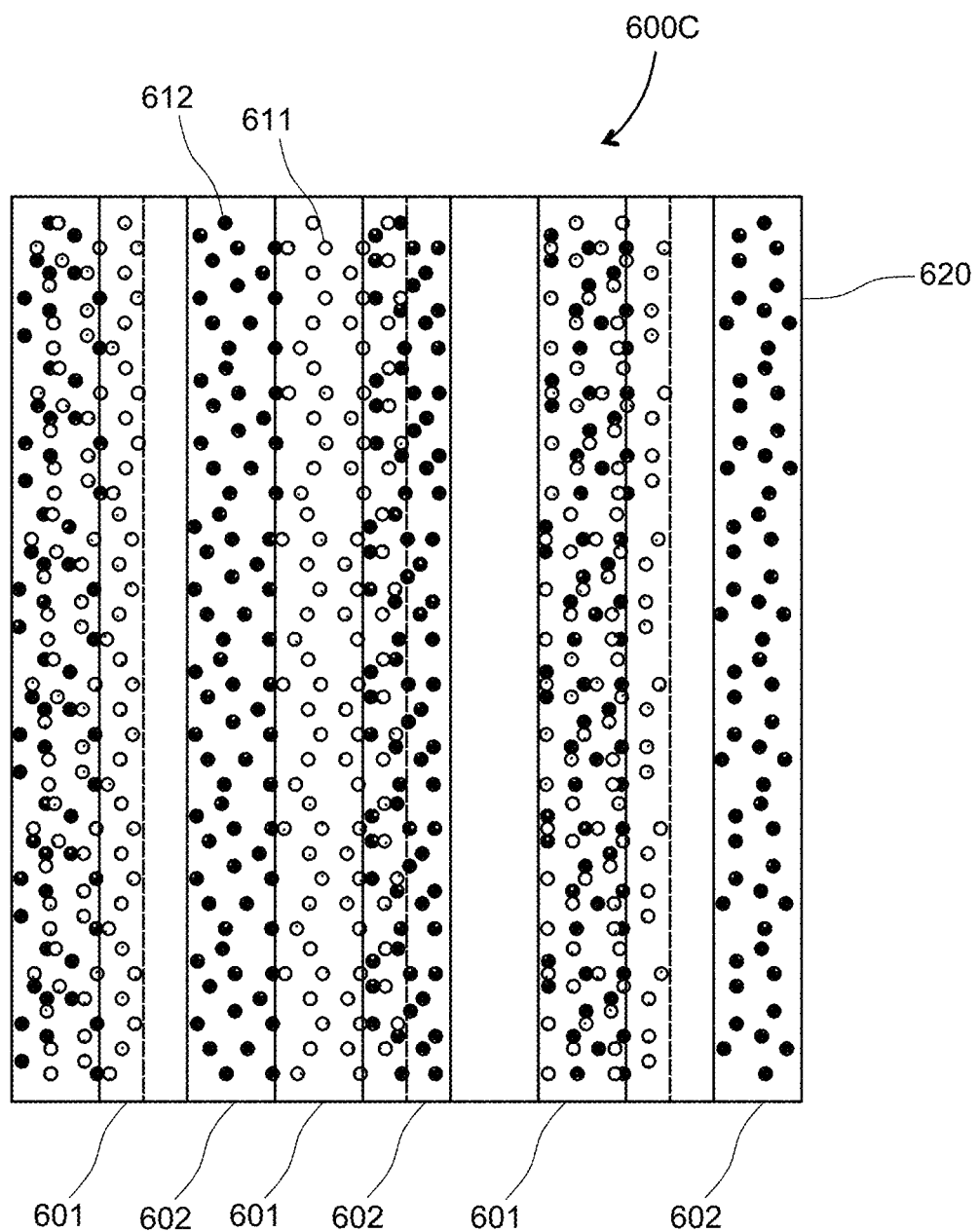
FIG. 6C is a top view of a diffraction grating comprising a layer of material with nanoparticles adhered to a top surface of the layer, the nanoparticles having distinct surface plasmon resonances.

Turning to FIG. 6C, a diffraction grating 600C is shown in a top view. The diffraction grating 600C is similar to the diffraction grating 600B of FIG. 6B, only in FIG. 6C, the first 611 and second 612 nanoparticles are adhered to a same upper surface of the layer 620, i.e. the layer 620 functions as a substrate layer for the first 611 and second 612 nanoparticles. This provides a two-wavelength resonance of the amplitudes of the corresponding peaks and valleys of the spatially varying optical permittivity $\varepsilon(\lambda,x)$. In FIG. 6C, the first grating structure 601 includes an array of first stripes of the first nanoparticles 611 at the first grating pitch, the and the second grating structure 602 includes an array of second stripes of the second nanoparticles 612 at the second, different grating pitch. By providing a third stripe of third nanoparticles having a plasmon resonance at a third, different wavelength, a three-wavelength resonance of the amplitudes of the corresponding peaks and valleys of the spatially varying optical permittivity ε(λ,x) may be obtained, as has been explained above with reference to FIG. 4. The three wavelengths can be selected to be close to centers of the R, G, and B color channels, which enables the diffraction grating 600C to redirect the R, G, and B color channels independently on each other, including diffracting the R, G, and B color channels in a same direction if so desired.

Figure 6D:
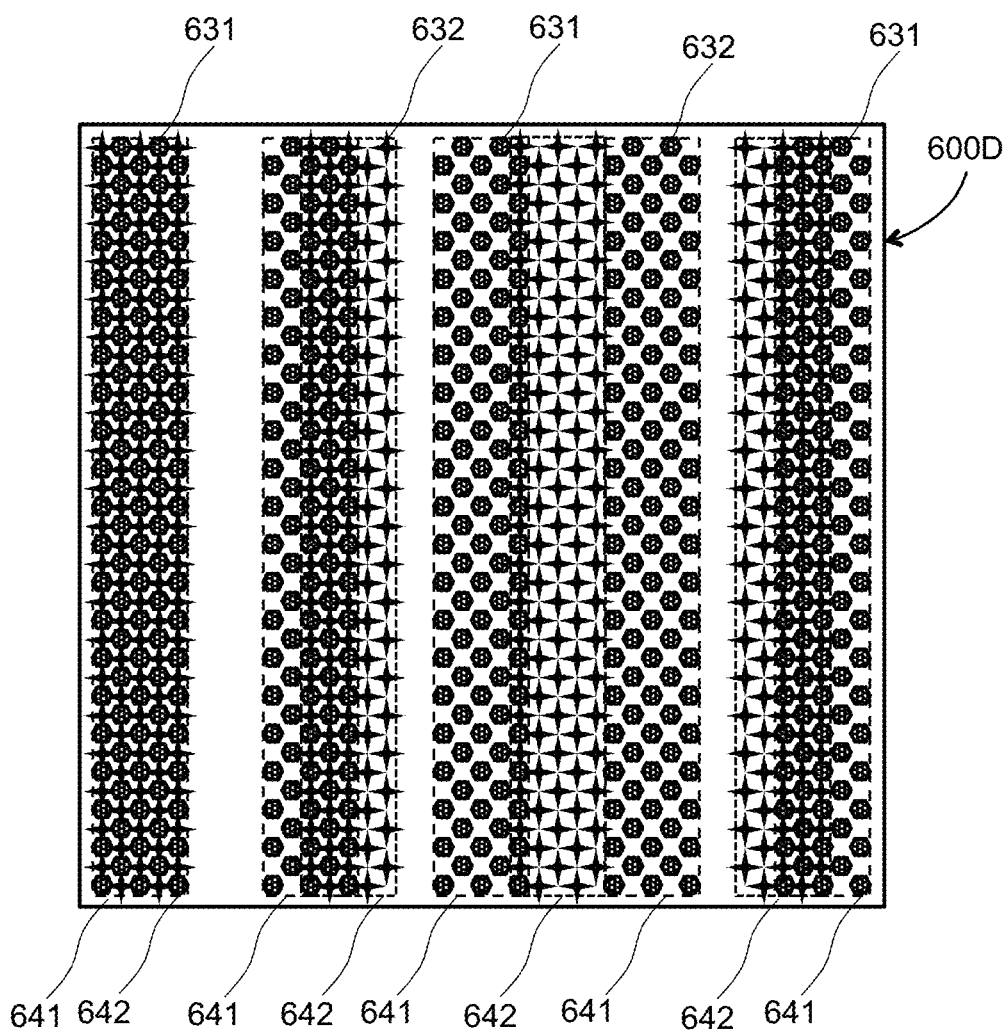
FIG. 6D is a top view of a diffraction grating comprising lithographically formed sub-arrays of nanoparticles having distinct surface plasmon resonances, the sub-arrays forming grooves or stripes of diffraction grating structures with different grating periods.

Referring now to FIG. 6D, a diffraction grating 600D is shown in top view. The diffraction grating 600D is similar to the diffraction grating 600C of FIG. 6C, only in FIG. 6D, the nanoparticles with different plasmon resonance wavelengths are defined using microfabrication methods based on photolithography, and are disposed in a repeating geometrical pattern, i.e. in an interlaced diamond pattern in FIG. 6D. Only two types of nanoparticles are shown for brevity. The first nanoparticles 631 are shown as hexagons, and the second nanoparticles 632 are shown as stars. The stripes of first nanoparticles 631 form a first sub-array 641 at a first pitch i.e. the period of stripes, and the stripes of second nanoparticles 632 form a second sub-array 642 at a second, larger pitch i.e. the period of stripes, creating a two-wavelength resonant spatially varying effective permittivity ε(λ, x). It is to be understood that the star and hexagon shaped nanoparticles are only examples, and a variety of lithographically defined nanoparticle shapes/sizes/compositions are possible, enabling one to engineer the wavelength and polarization sensitivity of the gratings formed by the nanoparticle sub-arrays.

Figure 7A:
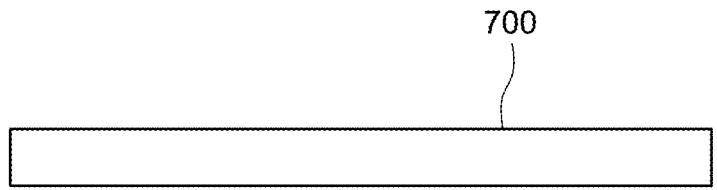
FIGS. 7A to 7F are side cross-sectional views of the diffraction grating of FIG. 6C at different stages of manufacture.
Figure 7B:
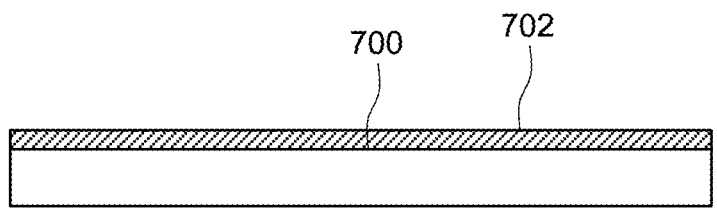
Figure 7C:
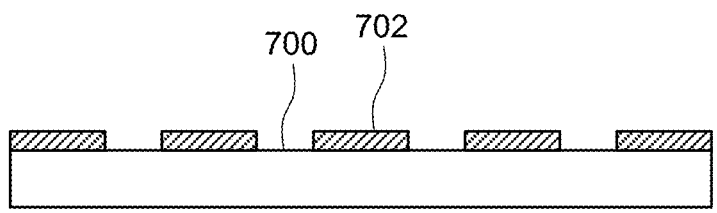
Figure 7D:
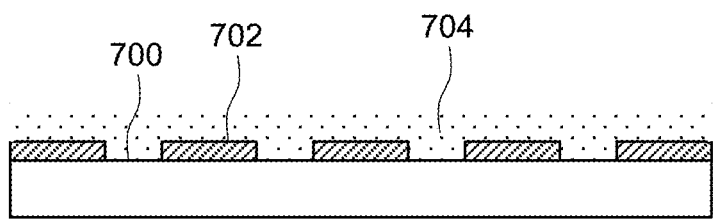
Figure 7E:
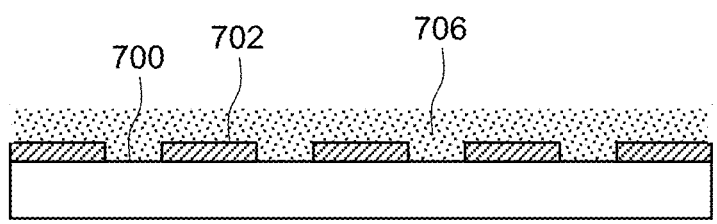
Figure 7F:
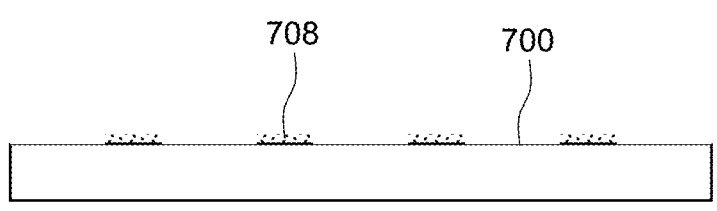

Photolithography and other microfabrication methods may be used not only to manufacture the diffraction grating 600D of FIG. 6D, but also to manufacture other types of plasmon-resonance based, wavelength-selective diffraction gratings. By way of example, referring to FIGS. 7A-7F, a process of manufacturing the diffraction grating 600C of FIG. 6C is illustrated. A substrate 700 (FIG. 7A) is coated with a photoresist 702 (FIG. 7B) using any suitable technique such as spin coating, for example. The photoresist 702 is then patterned (FIG. 7C) according to the desired diffraction grating structure using suitable photolithographic techniques, e.g. by exposing the photoresist to UV light through a pre-configured mask, and stripping or removing unexposed photoresist which was not photo-polymerized by the UV light. A solution 704 is then applied (FIG. 7D) that alters the hydrophilic/hydrophobic properties of the substrate 700. In this example, the substrate 700 is hydrophobic and the solution makes exposed areas of the substrate 700 hydrophilic, although a reverse scenario, i.e. a hydrophilic substrate and hydrophobic solution, is also possible. Then, a colloidal solution 706 of nanoparticles, e.g. silver nanoparticles, is applied (FIG. 7E), causing the nanoparticles to adhere to exposed areas 708 of substrate (FIG. 7F), which were made hydrophilic (FIG. 7D). The remaining photoresist 702 may then be stripped away.

Figure 8A:
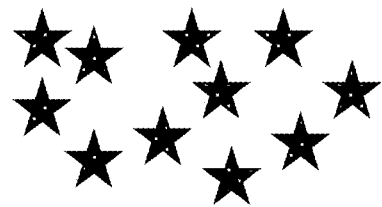
FIGS. 8A to 8D are views of different nanoparticles for use in diffraction gratings of FIGS. 6A to 6D.
Figure 8B:
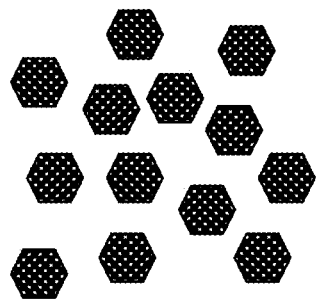
Figure 8C:
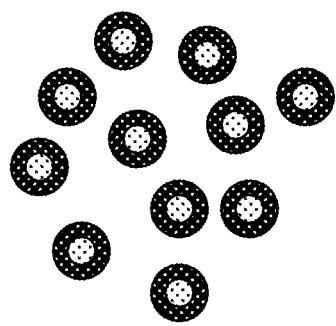
Figure 8D:
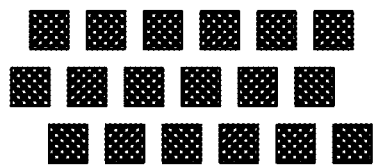

Turning to FIGS. 8A to 8D, various nanoparticles may be provided in various configurations including but not limited to stars (FIG. 8A), hexagons (FIG. 8B), compound spheres or core shells (FIG. 8C) and ordered, or arrayed structures (FIG. 8D). Both ordered and non-ordered, i.e. pseudorandom, nanoparticle configurations and structures may be defined lithographically.

Figure 9:
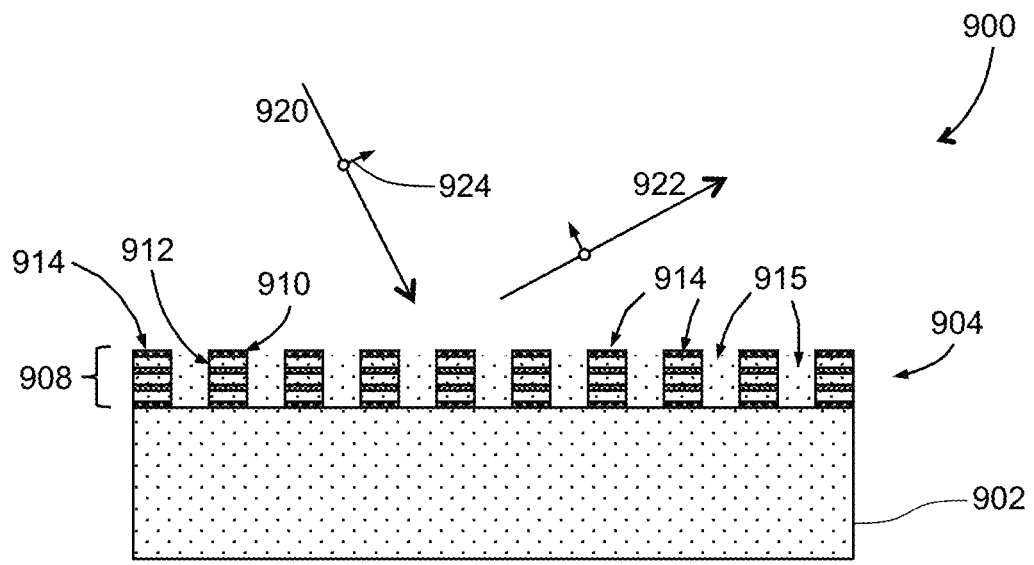
FIG. 9 is a side cross-sectional view of a diffraction grating comprising a hyperbolic metamaterial.

Other types of gratings can be provided. According to one embodiment, a diffraction grating having different grating pitches for different wavelengths may be constructed using metamaterials. A metamaterial structure can include a stack of thin layers of metal, semiconductor, and/or insulator, patterned to form an array of stripes at a desired pitch. Referring to FIG. 9, a metamaterial diffraction grating 900 includes a substrate 902 and a patterned hyperbolic metamaterial layer 904 supported by the substrate 902 and including a stack 908 of silver (Ag; 910) and silicon (Si; 912) etched through to the substrate 902 to construct an array of stripes 914, which act as diffraction grating grooves for diffracting an incoming optical beam 920 to produce a diffracted optical beam 922. The array of stripes 914 can be backfilled with an index-matching material 915.

Figure 10A:
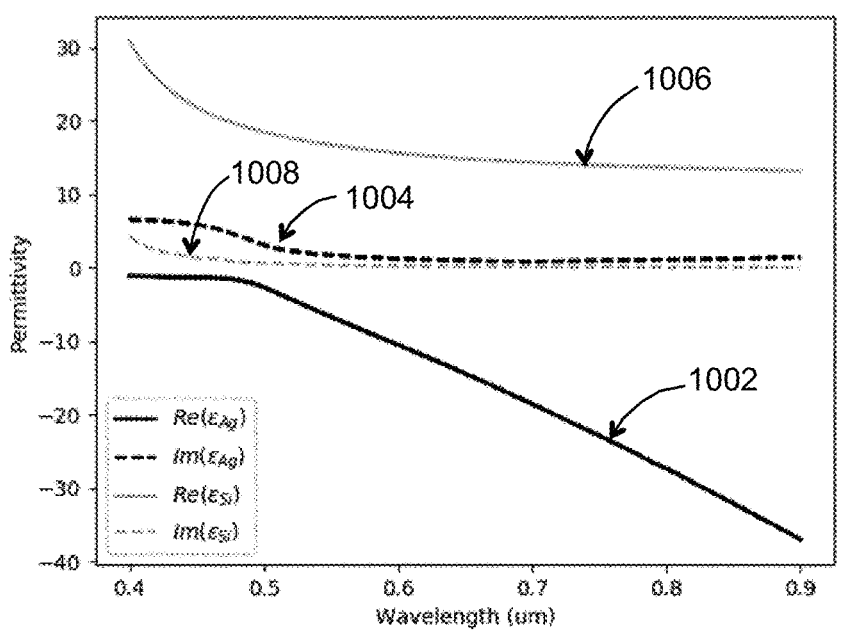
FIG. 10A is a permittivity spectrum of silver (Ag) and silicon (Si) materials.
Figure 10B:
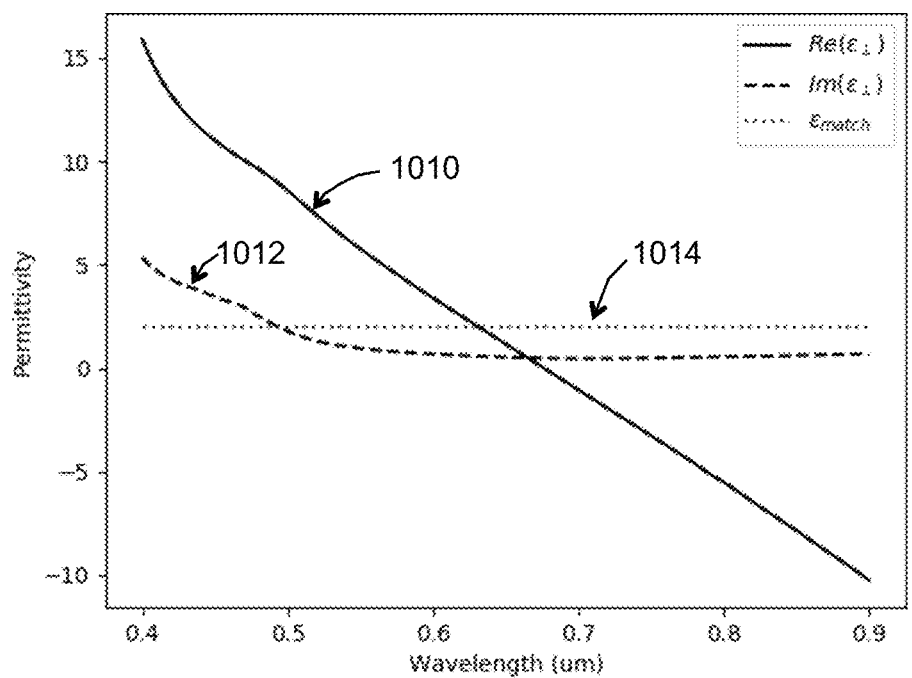
FIG. 10B is a permittivity spectrum of a hyperbolic metamaterial comprising a stack of thin Ag and Si layers.

The optical properties of the stack 908 depend on Ag/Si fill ratio. The bulk optical permittivity of Ag and Si is shown in FIG. 10A. The real part of Ag permittivity $Re(\varepsilon_{Ag})$ 1002 is shown with a thick solid line, the imaginary part of Ag permittivity $Im(\varepsilon_{Ag})$ 1004 is shown with a thick dashed line, the real part of Si permittivity $Re(\varepsilon_{Si})$ 1006 is shown with a thin solid line, and the imaginary part of Si permittivity $Im(\varepsilon_{Si})$ 1008 is shown with thin dashed line. The engineered metamaterial permittivity is shown in FIG. 10B for optical beam polarization 924 (FIG. 9) in plane of incidence marked with "⊥" sign. The real part of the metamaterial permittivity $Re(\varepsilon_\perp)$ 1010 (FIG. 10B) is shown with a thick solid line, the imaginary part f the metamaterial permittivity $Im(\varepsilon_\perp)$ 1012 is shown with a thick dashed line, and permittivity $\varepsilon_{match}$ 1014 of the matching material 915 is shown with a thin dotted line. One can see from FIG. 10B that the real part of the permittivity $Re(\varepsilon_\perp)$ 1010, corresponding to the refractive index, may be matched to the permittivity of the surrounding medium $\varepsilon_{match}$ 1014, i.e. the matching material 915 in this case, essentially causing the grating to "disappear" for an optical beam at the index matching wavelength.

Figure 11:
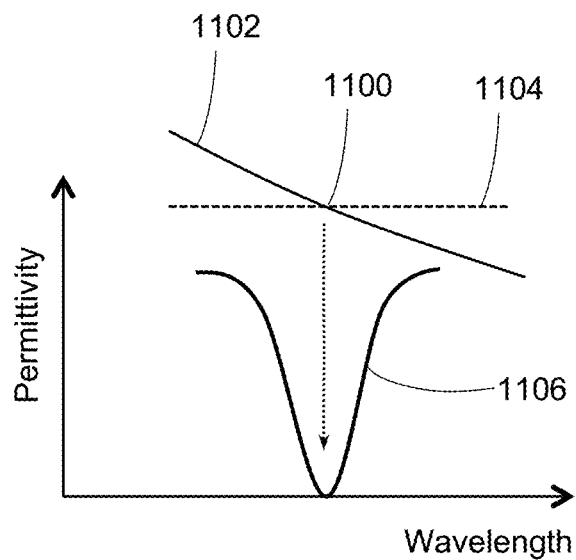
FIG. 11 is a spectral plot of refractive index contrast of the hyperbolic metamaterial of FIG. 10B.

The latter point is further illustrated in FIG. 11. The grating permittivity 1102 crosses the surrounding medium permittivity 1104 at a crossing point 1100. At a wavelength of the crossing point 1100 between the grating permittivity 1102 and surrounding medium permittivity 1104, a permittivity contrast curve 1106 has a null, i.e. goes down to zero. The nulling point effectively "erases" the grating for the light at the index matching wavelength. Accordingly, the light at the index matching wavelength will not be diffracted at all.

Figure 12:
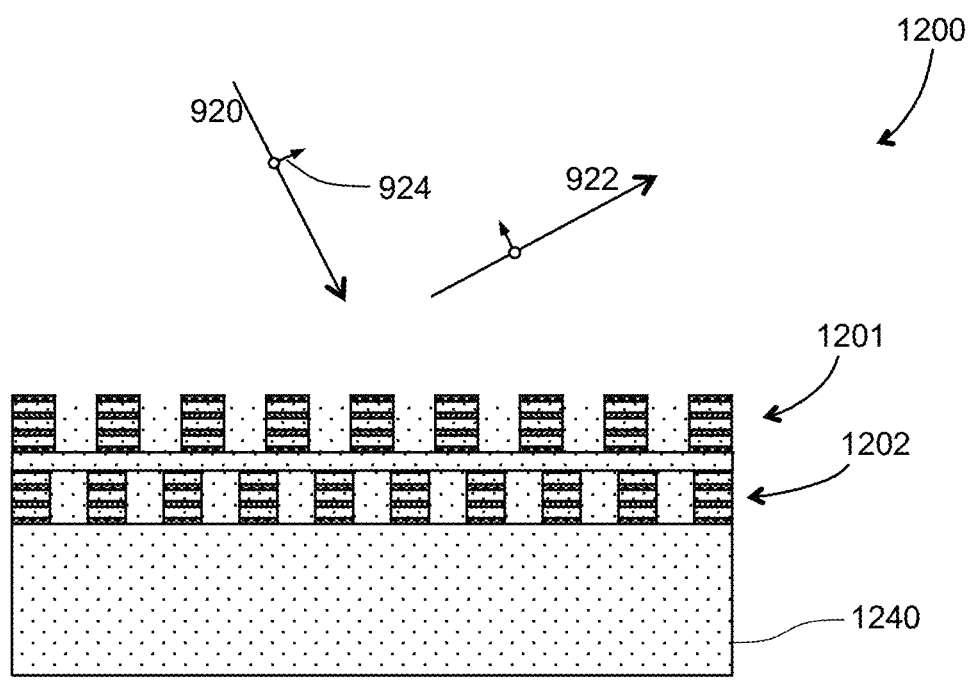
FIG. 12 is a side cross-sectional view of a diffraction grating comprising two hyperbolic metamaterial sub-gratings.
Figure 13:
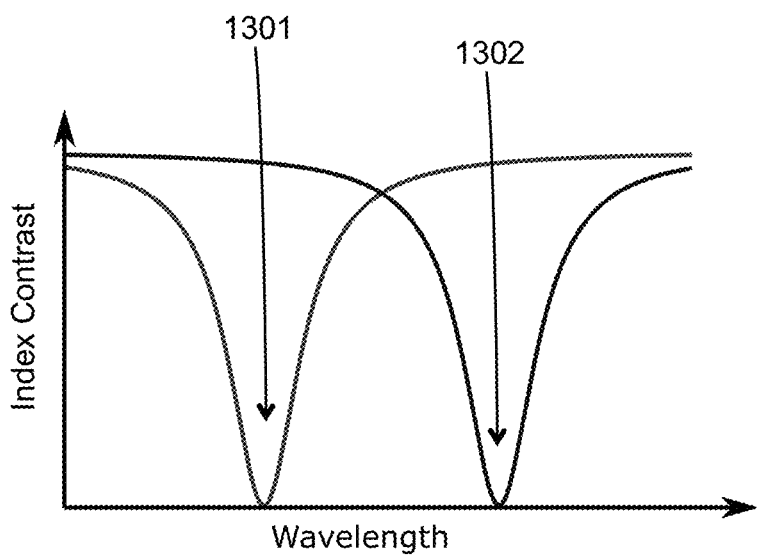
FIG. 13 is a spectral plot of refractive index contrast of the diffraction grating of FIG. 12.

The nulling effect of a hyperbolic metamaterial grating may be used to construct a compound diffraction grating, in which the diffraction of light at two different wavelength is independently controlled. Referring to FIG. 12, a diffraction grating 1200 includes first 1201 and second 1202 grating structures supported by a substrate 1240. The first 1201 and second 1202 grating structures operate at first and second different wavelengths. Each one of the first 1201 and second 1202 grating structures includes its own hyperbolic metamaterial grating structure, with different pitches of the metamaterial stripes, and, optionally, with different metamaterial compositions. In FIG. 12, the first grating structure 1201 has a larger pitch than the second grating structure 1202. The Ag/Si fill ratio can be selected such as to null out the refractive index contrast, and accordingly, the diffraction efficiency, at two different wavelengths, as shown in FIG. 13. The first grating structure 1201 has a null point 1301 at the second wavelength, i.e. working wavelength of the second grating structure 1202, and vice versa: the second grating structure 1202 has a null point 1302 at the first wavelength. This allows independent control of diffraction of the light beam 920 at the two wavelengths, making it possible to equate the diffraction angle of the diffracted optical beam 922 for the two wavelengths, if required. The diffraction grating 1200, taken as a whole, can be described by the spatially varying, wavelength-dependent permittivity illustrated in FIG. 4 above, where at the first wavelength, the spatially varying optical permittivity comprises a plurality of peaks and valleys at a first pitch, and at the second, different wavelength, the spatially varying optical permittivity comprises a plurality of peaks and valleys at a second, different pitch.

Other material combinations than Ag/Si may be used. By way of non-limiting examples, each stripe of the first grating structure 1201 can include a stack of alternating metal and semiconductor layers, or metal and dielectric layers, having a first set of thicknesses to provide a zero refractive index contrast at the second wavelength. Each stripe of the second grating structure can include a stack of alternating metal and semiconductor layers, or metal and dielectric layers, or both, having a second set of thicknesses to provide a zero refractive index contrast at the first wavelength. A ratio of the first to second grating pitches can be made equal to a ratio of the first to second wavelengths. As follows from the grating equation (1) above, components of an optical beam at the first and second wavelengths impinging on such diffraction grating will be diffracted at a substantially same angle.

The diffraction grating structures described above, including plasmon-resonant gratings and metamaterials gratings, can be used to construct optical waveguides for near-eye displays, for example the pupil-replicating waveguide 174 of the optics block 100A of FIG. 1A; the grating structures 101/111 on the slab 121, the grating structures 102/112 on the slab 122, the grating structures 103/113 on the slab 123, of the optics block 100B of FIG. 1B; or the grating structures 350/360 on the slab 320 of the optics block 300 of FIG. 3A.

Figure 14A:
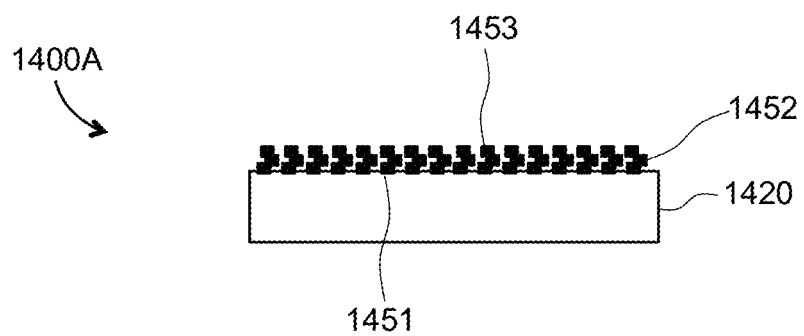
FIG. 14A is a side cross-sectional view of an optical waveguide for near-eye display, including a plurality of grating structures on top of one another.

Referring to FIG. 14A with further reference to FIG. 2A, an optical waveguide 1400A for a near-eye display includes a slab 1420 of transparent material and a first grating structure 1451 supported by the slab 1420. The first grating structure 1451 has a first spatial variation of optical permittivity having a first grating pitch and a wavelength-dependent first amplitude 201 (FIG. 2A), such that at the first wavelength $\lambda_1$, the first amplitude 201 is above the first threshold $T_1$ and at the second wavelength $\lambda_2$, the first amplitude 201 is below the second threshold $T_2$. A second grating structure 1452 is supported by the first grating structure 1451. The second grating structure 1452 has the second spatial variation of optical permittivity having the second grating pitch and the wavelength-dependent second amplitude 202, such that at the first wavelength $\lambda_1$, the second amplitude 202 is below the second threshold $T_2$ and at the second wavelength $\lambda_2$, the second amplitude is above the first threshold $T_1$ (FIG. 2A).

The optical permittivity of the first grating structure 1451 can include a spatially varying real portion, i.e. a refractive index having a wavelength-dependent first refractive index contrast, and the optical permittivity of the second grating structure 1452 can include a spatially varying real portion, i.e. a refractive index having a wavelength-dependent second refractive index contrast such as shown in FIG. 2C: at the first wavelength $\lambda_1$, the first refractive index contrast 211 is above the first threshold $T_1$ and at the second wavelength $\lambda_2$, the first refractive index contrast 211 is below the second threshold $T_2$. Further, as shown in FIG. 2C, at the first wavelength $\lambda_1$, the second refractive index contrast 212 is below the second threshold $T_2$ and at the second wavelength $\lambda_2$, the second refractive index contrast 212 is above the second threshold $T_2$.

Figure 5:
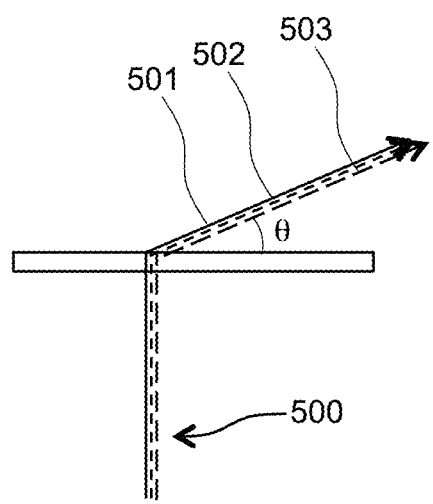
FIG. 5 is a side cross-sectional view of an embodiment of the diffraction grating of FIG. 4, in which the diffraction angles of three color channels are substantially equal to each other.

Still referring to FIG. 14A with further reference now to FIGS. 2B and 2C, a third grating structure 1453 may be provided. The third grating structure 1453 may be supported by the second grating structure 1452 and may have a third spatial variation of optical permittivity. The third spatial variation has a third grating pitch and a wavelength-dependent third amplitude. At the first $\lambda_1$ and second $\lambda_2$ wavelengths, the third amplitude 203 is below the second threshold $T_2$ (FIG. 2B) and at a third wavelength $\lambda_3$, the third amplitude 203 is above the first threshold $T_1$. Further, at the third wavelength $\lambda_3$, the first amplitude 201 and the second amplitude 202 are both below the second threshold $T_2$. Each one of the first $\lambda_1$, second $\lambda_2$, and third $\lambda_3$ wavelengths may correspond to a color channel of an electronic display, e.g. the electronic display 176 of FIG. 1A. In embodiments where the diffraction angle for the different color channels is the same as illustrated in FIG. 5, ratios of the first grating pitch to the first wavelength $\lambda_1$; the second grating pitch to the second wavelength $\lambda_2$; and the third grating pitch to the third wavelength $\lambda_3$ can be made equal to each other, causing the individual color channel sub-beams 501, 502, and 503 to co-propagate.

The grating structures 1451, 1452, and 1453 may be implemented by using various technologies and material systems. In one embodiment, the grating structures 1451, 1452, and 1452 may include resonant nanoparticles of different surface plasmon resonant wavelengths or optical frequencies, which may correspond to different color channels of an electronic display. The nanoparticles of various shapes/sizes/compositions, e.g. as shown in FIGS. 8A-8D, may be disposed at different spatially varying densities to form respective grating groove structures, e.g. as shown in FIGS. 6A-6D.

In one embodiment, the first grating structure 1451 may include a first hyperbolic metamaterial comprising the array of first stripes at the first grating pitch, and the second grating structure 1452 may include a second hyperbolic metamaterial comprising an array of second stripes at the second grating pitch, similarly to the first grating structure 1201 and the second grating structure 1202 of FIG. 12. The array of first stripes can have a zero refractive index contrast at the second wavelength, and the array of second stripes can have zero refractive index contrast at the first wavelength, as illustrated in FIG. 13. Each first stripe can include a stack of alternating metal and semiconductor layers, or metal and insulating layers, or both, having a first set of thicknesses to provide a zero refractive index contrast at the second wavelength. Similarly, each second tripe can include a stack of alternating metal and semiconductor layers having a second set of thicknesses to provide a zero refractive index contrast at the first wavelength. In both resonant nanoparticle and metamaterial grating embodiments, the period or pitch of the stripes may be selected to control the diffraction angles of the R, G, and B color channels independently of one another. For example, all three diffraction angles may be selected to be equal to each other.

Figure 14B:
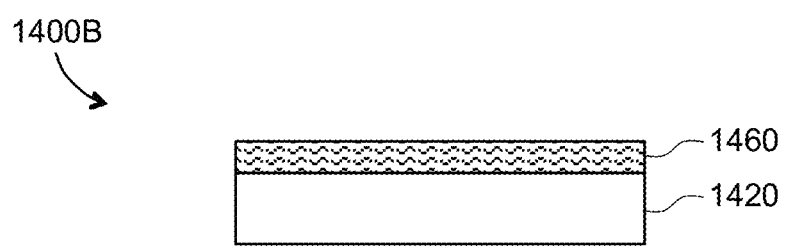
FIG. 14B is a side cross-sectional view of an optical waveguide for near-eye display, including a diffracting grating having a spatially varying optical permittivity dependent on wavelength.

Turning to FIG. 14B with further reference to FIG. 4, an optical waveguide 1400B for a near-eye display includes the slab 1420 of transparent material and a diffraction grating 1460 supported by the slab and including a layer of material having the spatially varying optical permittivity $\varepsilon(\lambda,x)$ dependent on wavelength as illustrated in the 3D spectral-spatial diagram of FIG. 4. At the first (R channel) wavelength $\lambda_1$, the spatially varying optical permittivity $\varepsilon(\lambda,x)$ comprises a plurality of peaks 401 and valleys 402 at a first spatial period or pitch $d_1$. At the second (G channel) wavelength $\lambda_2$, the spatially varying optical permittivity $\varepsilon(\lambda,x)$ comprises a plurality of peaks 411 and valleys 412 at a second, different spatial period or pitch $d_2$. Furthermore, at the third (B channel) wavelength $\lambda_2$, the spatially varying optical permittivity $\varepsilon(\lambda,x)$ may include a plurality of peaks 421 and valleys 422 at a first spatial period or pitch $d_3$. For phase gratings, the spatially varying optical permittivity $\varepsilon(\lambda,x)$ comprises a spatially varying refractive index $n(\lambda,x)$ corresponding to the real part of the spatially varying optical permittivity $\varepsilon(\lambda,x)$. For amplitude gratings, the spatially varying optical permittivity $\varepsilon(\lambda,x)$ comprises a spatially varying absorption coefficient $\alpha(\lambda,x)$, corresponding to the imaginary part of the spatially varying optical permittivity $\varepsilon(\lambda,x)$. To make sure that components of an optical beam at the first $\lambda_1$ and second $\lambda_2$ wavelengths impinging on the diffraction grating 1460 are diffracted at a substantially same diffraction angle as shown in FIG. 5, a ratio of the first $d_1$ to second $d_2$ pitches can be made equal to a ratio of the first $\lambda_1$ to second $\lambda_2$ wavelengths. Similarly, a ratio of the first $d_1$ to third $d_3$ pitches can be made equal to a ratio of the first $\lambda_1$ to third $\lambda_3$ wavelengths.

The diffraction grating 1460 may be constructed using various technologies and material systems. In one embodiment, the diffraction grating 1460 may include a plurality of first nanoparticles at a first spatially varying density, having a surface plasmon resonance at the first wavelength $\lambda_1$, and a plurality of second nanoparticles at a second spatially varying density, having a surface plasmon resonance at the second wavelength $\lambda_2$. The nanoparticles of various shapes/sizes/compositions, e.g. as shown in FIGS. 8A-8D, may be disposed at different spatially varying densities to form respective grating groove structures, e.g. as shown in FIGS. 6C and 6D. By way of a non-limiting example, the plurality of first nanoparticles may include an array of first stripes of nanoparticles at the first pitch, and the plurality of second nanoparticles may include an array of second stripes of nanoparticles at the second pitch.

Still referring to FIG. 14B with further reference now to FIGS. 12 and 13, the diffraction grating 1460 may also include a hyperbolic metamaterial. The hyperbolic metamaterial may include an array of first stripes at the first pitch (the first grating structure 1201 in FIG. 12) and having a zero refractive index contrast at the second wavelength (1302 in FIG. 13), and an array of second stripes at the second pitch (the second grating structure 1202 in FIG. 12) and having a zero refractive index contrast at the first wavelength (1301 in FIG. 13). Each first stripe can include a stack of alternating metal and semiconductor layers, metal and insulator layers, or both, having a first set of thicknesses to provide a zero refractive index contrast at the second wavelength $\lambda_2$, and each second tripe can include a stack of alternating metal and semiconductor layers, metal and insulator layers, or both, having a second set of thicknesses to provide a zero refractive index contrast at the first wavelength $\lambda_1$. In both resonant nanoparticle and metamaterial grating embodiments, the period or pitch of the stripes may be selected to control the diffraction angles of the R, G, and B color channels independently on one another. For example, all three diffraction angles may be selected to be equal to each other as illustrated in FIG. 5.

Figure 15:
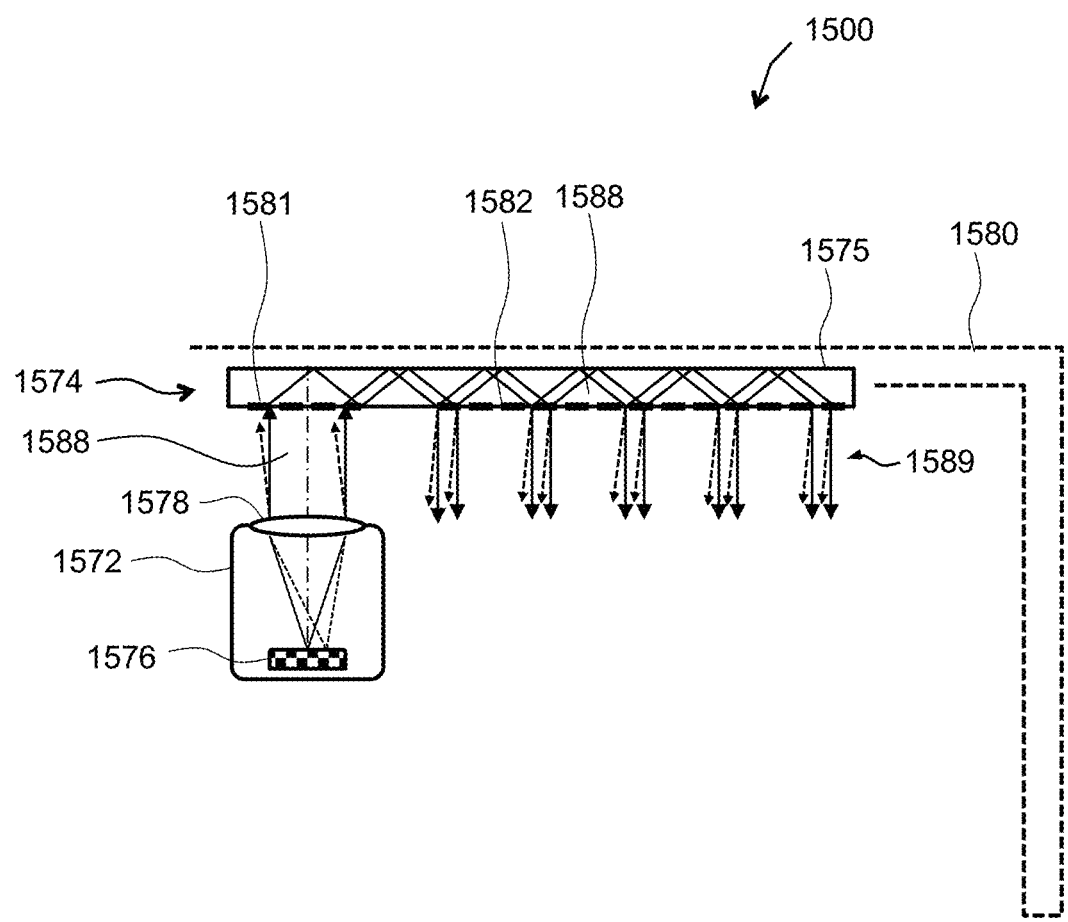
FIG. 15 is a side cross-sectional view of a near-eye display of the present disclosure.

The diffraction gratings described above can be used in an optics block of a near-eye display, such as the optics block 100A of FIG. 1A or FIG. 15. Referring specifically to FIG. 15, a near-eye display 1500 includes a body 1580, a pupil-replicating optical waveguide 1574, an electronic display 1576 for providing image light 1588, and collimating optics represented by a lens 1578 for collimating the image light 1588. The image light 1588 may contain at least two color channels, e.g. first and second color channels, three color channels, e.g. first, second, and third color channels, or more. The electronic display 1576 and the lens 1578 are parts of a projector 1572. The body 1580 may be of different shapes, from a simple sunglasses frame to a complete enclosure to be worn on a user's head.

The pupil-replicating optical waveguide 1574 is configured to receive and guide therein the image light 1588 from the electronic display 1576. To that end, the optical waveguide 1574 may include a slab 1575 of transparent material such as glass or plastic, a first diffraction grating 1581 supported by the slab 1575 and configured for receiving the image light 1588 from the electronic display 1576 for coupling into the slab 1575. A second diffraction grating 1582 is supported by the same slab 1575, and is configured for receiving the optical beam 188 from the first diffraction grating 1581 through the slab 1575 for out-coupling output light 1589 from the slab 1575. In one embodiment, each one of the first 1581 and second 1582 diffraction gratings includes a layer of material having a spatially varying optical permittivity dependent on wavelength shown in FIG. 4. At the first wavelength $\lambda_1$ of the first color channel, the spatially varying optical permittivity $\varepsilon(\lambda,x)$ comprises a plurality of peaks and valleys at a first spatial period (pitch), and at the second wavelength $\lambda_2$ of the second color channel, the spatially varying optical permittivity $\varepsilon(\lambda,x)$ comprises a plurality of peaks and valleys at a second, different spatial period (pitch). In cases where the permittivity $\varepsilon(\lambda,x)$ is represented by a real number, the amplitude of the permittivity variation corresponds to a refractive index contrast of the grating structure, which is wavelength-dependent, such that at different wavelengths, the grating has different pitch. Alternatively or in addition, each one of the first 1581 and second 1582 diffraction gratings may also include a plurality of grating structures, each for diffracting light at a particular color channel, while being substantially transparent, i.e. showing no diffraction, at the wavelengths of the remaining color channels. The amplitude of spatial variation of permittivity of such gratings is schematically illustrated in FIGS. 2A-2C. In any of the above embodiments, the period or pitch of the spatial variations of optical permittivity $\varepsilon(\lambda,x)$ or refractive index $n(\lambda,x)$ may be selected to control the diffraction angles of different color channels, i.e. the R, G, and B color channels, independently on one another.

By way of a non-limiting example, all three diffraction angles may be selected to be equal to each other as illustrated in FIG. 5. In operation, components of the image light 1588 (FIG. 15) at the first $\lambda_1$ and second $\lambda_2$ wavelengths impinging on the first diffraction grating 1581 are diffracted at a substantially same angle for joint propagation in the slab 1575. Components of the image light 1588 at the first $\lambda_1$ and second $\lambda_2$ wavelengths impinging on the second diffraction grating 1582 are diffracted at a substantially same angle for joint propagation towards an eye of a user. The first 1581 and second 1582 diffraction gratings may also be configured to operate with three or more color channels. For example, the first wavelength $\lambda_1$ can correspond to the red (R) color channel, the second wavelength $\lambda_2$ can correspond to the green (G) color channel, and the third wavelength $\lambda_3$ can correspond to the blue (B) color channel. The amplitude and the spatial period (pitch) of spatial oscillations of the permittivity $|\varepsilon(\lambda,x)|$ of the diffraction gratings 1581 and 1582 can be wavelength-dependent, as shown in FIG. 4, for independent control of the diffraction angle of each color channel.

Figure 16A:
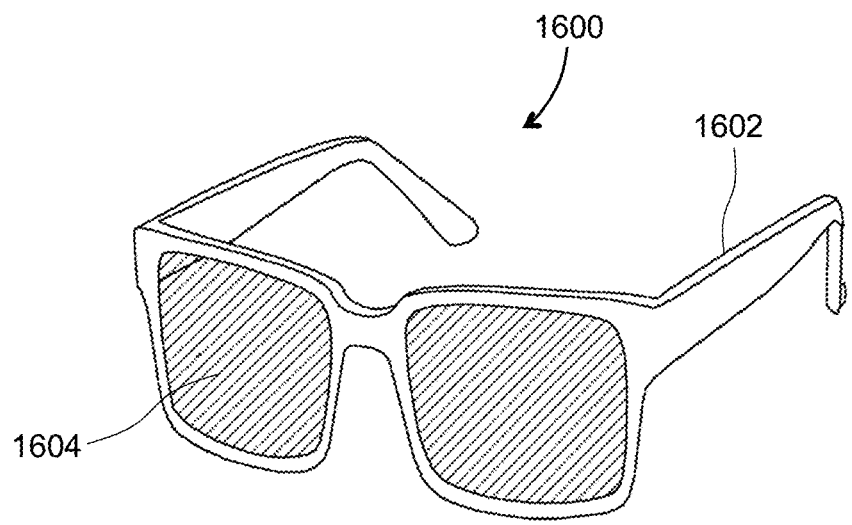
FIG. 16A is an isometric view of an eyeglasses form factor near-eye AR/VR display incorporating an optics block with diffraction gratings of the present disclosure.
Figure 16B:
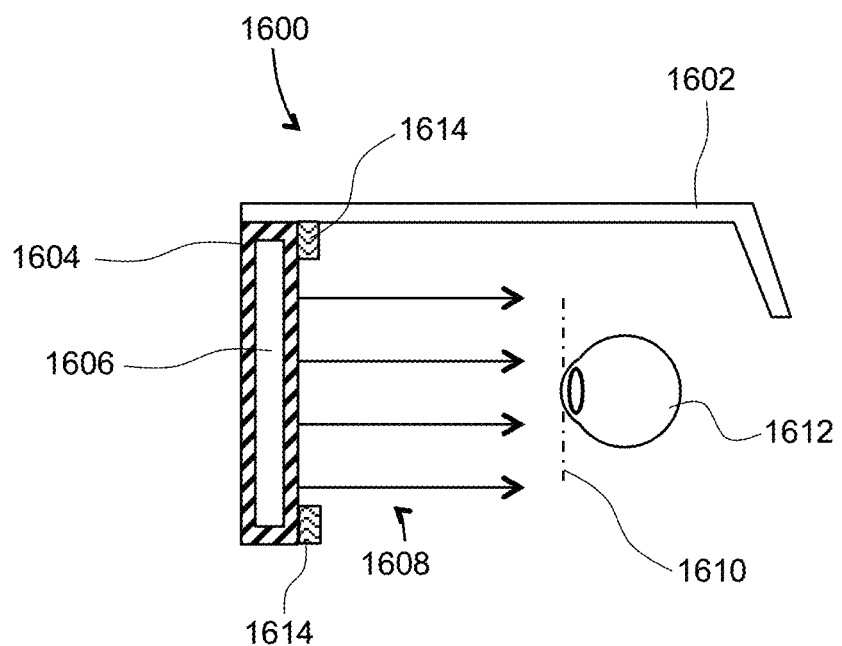
FIG. 16B is a side cross-sectional view of the display of FIG. 16A.

The diffraction gratings and optics blocks described herein may be used to provide multi-wavelength light guiding, directing, and/or coupling for an HIVID in an efficient, space-saving manner. Referring to FIGS. 16A and 16B, a near-eye artificial reality (AR)/virtual reality (VR) display 1600 is an embodiment of the near-eye display 1500 of FIG. 15, and can include the optics block 100A of FIG. 1A, the optics block 100B of FIG. 1B, and/or the optics block 300 of FIG. 3A. A body or frame 1602 of the near-eye AR/VR display 1600 has a form factor of a pair of eyeglasses, as shown. A display 1604 includes a display assembly 1606, for example, the optics block 100A of FIG. 1A or the optics block 100B of FIG. 1B. The display assembly 1606 (FIG. 16) provides image light 1608 to an eyebox 1610, i.e. a geometrical area where a good-quality image may be presented to a user's eye 1612. The display assembly 1606 may include a separate VR/AR display module for each eye, or one VR/AR display module for both eyes. For the latter case, an optical switching device may be coupled to a single electronic display for directing images to the left and right eyes of the user in a time-sequential manner, one frame for left eye and one frame for right eye. The images are presented fast enough, i.e. with a fast enough frame rate, that the individual eyes do not notice the flicker and perceive smooth, steady images of surrounding virtual or augmented scenery. An electronic display of the display assembly 1606 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. More generally, such a display may be provided for any of the display modules or systems disclosed herein. The near-eye AR/VR display 1600 may also include an eye-tracking system 1614 for determining, in real time, the gaze direction and/or the vergence angle of the user's eyes 1612. The determined vergence angle may then be used to obtain the Diopter value of the display's varifocal lenses for lessening the vergence-accommodation conflict. The determined gaze direction and vergence angle may also be used for real-time compensation of visual artifacts dependent on the angle of view and eye position, such as luminance uniformity, color uniformity, pupil swim, etc. Furthermore, the determined vergence and gaze angles may be used for interaction with the user, highlighting objects, bringing objects to the foreground, dynamically creating additional objects or pointers, etc. Furthermore, the near-eye AR/VR display 1600 may include an audio system, such as small speakers or headphones.

Figure 17:
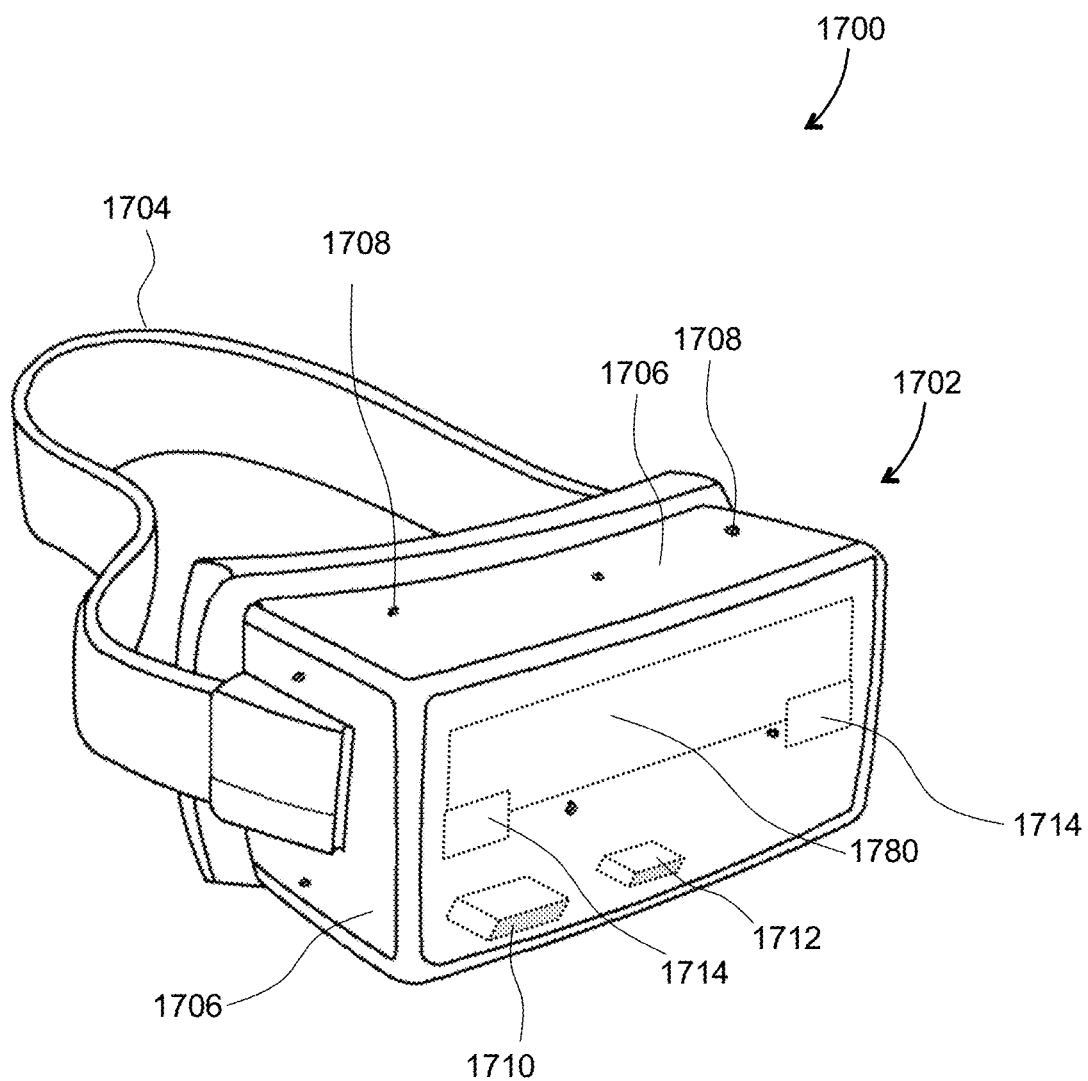
FIG. 17 is an isometric view of a head-mounted display (HMD) incorporating an optics block with diffraction gratings of the present disclosure.

Turning now to FIG. 17, an HMD 1700 is an example of an AR/VR wearable display system which encloses the user's face, for a greater degree of immersion into the AR/VR environment. The HIVID 1700 can present content to a user as a part of an AR/VR system, which may further include a user position and orientation tracking system, an external camera, a gesture recognition system, control means for providing user input and controls to the system, and a central console for storing software programs and other data for interacting with the user for interacting with the AR/VR environment. The function of the HIVID 1700 is to augment views of a physical, real-world environment with computer-generated imagery, and/or to generate the entirely virtual 3D imagery. The HMD 1700 may include a front body 1702 and a band 1704. The front body 1702 is configured for placement in front of eyes of a user in a reliable and comfortable manner, and the band 1704 may be stretched to secure the front body 1702 on the user's head. A display system 1780 may include the optics block 100A of FIG. 1A, the optics block 100B of FIG. 1B, the optics block 300 of FIG. 3A, the near-eye display 1500 of FIG. 15, which may include any of the diffraction gratings described herein. The display system 1780 may be disposed in the front body 1702 for presenting AR/VR imagery to the user. Sides 1706 of the front body 1702 may be opaque or transparent.

In some embodiments, the front body 1702 includes locators 1708, an inertial measurement unit (IMU) 1710 for tracking acceleration of the HIVID 1700, and position sensors 1712 for tracking position of the HIVID 1700. The locators 1708 are traced by an external imaging device of a virtual reality system, such that the virtual reality system can track the location and orientation of the entire HIVID 1700. Information generated by the IMU and the position sensors 1712 may be compared with the position and orientation obtained by tracking the locators 1708, for improved tracking of position and orientation of the HIVID 1700. Accurate position and orientation is important for presenting appropriate virtual scenery to the user as the latter moves and turns in 3D space.

The HIVID 1700 may further include an eye tracking system 1714, which determines orientation and position of user's eyes in real time. The obtained position and orientation of the eyes allows the HIVID 1700 to determine the gaze direction of the user and to adjust the image generated by the display system 1780 accordingly. In one embodiment, the vergence, that is, the convergence angle of the user's eyes gaze, is determined. The determined gaze direction and vergence angle may also be used for real-time compensation of visual artifacts dependent on the angle of view and eye position, such as luminance uniformity, color uniformity, pupil swim, etc. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1702.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth of the present disclosure as described herein.

What is claimed is:

1. A diffraction grating comprising:
a first grating structure having a first refractive index contrast, wherein the first refractive index contrast has a first grating pitch and a wavelength-dependent first amplitude, such that at a first wavelength, the first amplitude is above a first threshold and at a second wavelength, the first amplitude is below a second threshold, wherein the second threshold is lower than the first threshold; and
a second grating structure having a second refractive index contrast, wherein the second refractive index contrast has a second grating pitch and a wavelength-dependent second amplitude, such that at the first wavelength, the second amplitude is below the second threshold and at the second wavelength, the second amplitude is above the first threshold.

2. The diffraction grating of claim 1, wherein the second threshold is below 10% of the first threshold.

3. The diffraction grating of claim 2, wherein the second threshold is below 1% of the first threshold.

4. The diffraction grating of claim 3, wherein at the second wavelength, the first refractive index contrast is substantially zero, and wherein at the first wavelength, the second refractive index contrast is substantially zero.

5. The diffraction grating of claim 4, wherein the first grating structure comprises a first hyperbolic metamaterial comprising an array of first stripes at the first grating pitch and having a zero refractive index contrast at the second wavelength, and wherein the second grating structure comprises a second hyperbolic metamaterial comprising an array of second stripes at the second grating pitch and having a zero refractive index contrast at the first wavelength.

6. The diffraction grating of claim 5, wherein each first stripe comprises a stack of alternating metal and semiconductor layers having a first set of thicknesses to provide the zero refractive index contrast at the second wavelength, and wherein each second stripe comprises a stack of alternating metal and semiconductor layers having a second set of thicknesses to provide the zero refractive index contrast at the first wavelength.

7. The diffraction grating of claim 6, wherein each first stripe comprises a stack of alternating metal and dielectric layers having a first set of thicknesses to provide the zero refractive index contrast at the second wavelength, and wherein each second stripe comprises a stack of alternating metal and dielectric layers having a second set of thicknesses to provide the zero refractive index contrast at the first wavelength.

8. The diffraction grating of claim 6, wherein a ratio of the first to second grating pitches is equal to a ratio of the first to second wavelengths, such that in operation, components of an optical beam at the first and second wavelengths impinging on the diffraction grating are diffracted at a substantially same diffraction angle.

9. The diffraction grating of claim 1, further comprising a third grating structure having a third refractive index contrast, wherein the third refractive index contrast has a third grating pitch and a wavelength-dependent third amplitude, such that at the first and second wavelengths, the third amplitude is below the second threshold and at a third wavelength, the third amplitude is above the first threshold, wherein at the third wavelength, the first amplitude and the second amplitude are both below the second threshold, and wherein each one of the first, second, and third wavelengths corresponds to a color channel of an electronic display.

10. The diffraction grating of claim 9, wherein ratios of the first grating pitch to the first wavelength; the second grating pitch to the second wavelength; and the third grating pitch to the third wavelength are equal to each other, such that in operation, components of an optical beam at the first, second, and third wavelengths emitted by the electronic display and impinging on the diffraction grating are diffracted at a substantially same diffraction angle.

11. The diffraction grating of claim 1, wherein the first and second grating structures are disposed adjacent one another.

12. The diffraction grating of claim 11, wherein the second grating structure is disposed on top of the first grating structure.

13. A diffraction grating comprising a layer of metamaterial with a spatially varying optical permittivity dependent on wavelength, such that:
at a first wavelength, the spatially varying optical permittivity comprises a plurality of peaks and valleys at a first pitch; and
at a second, different wavelength, the spatially varying optical permittivity comprises a plurality of peaks and valleys at a second, different pitch;
wherein the spatially varying optical permittivity comprises a spatially varying refractive index; and
wherein the metamaterial comprises a hyperbolic metamaterial.

14. A diffraction grating comprising a layer of metamaterial with a spatially varying optical permittivity dependent on wavelength, such that:
at a first wavelength, the spatially varying optical permittivity comprises a plurality of peaks and valleys at a first pitch; and
at a second, different wavelength, the spatially varying optical permittivity comprises a plurality of peaks and valleys at a second, different pitch;
wherein the metamaterial comprises an array of first stripes at the first pitch having a zero refractive index contrast at the second wavelength, and an array of second stripes at the second pitch having a zero refractive index contrast at the first wavelength.

15. The diffraction grating of claim 14, wherein each first stripe comprises a stack of alternating metal and semiconductor layers having a first set of thicknesses to provide the zero refractive index contrast at the second wavelength, and wherein each second stripe comprises a stack of alternating metal and semiconductor layers having a second set of thicknesses to provide the zero refractive index contrast at the first wavelength.

16. The diffraction grating of claim 14, wherein each first stripe comprises a stack of alternating metal and dielectric layers having a first set of thicknesses to provide a zero refractive index contrast at the second wavelength, and wherein each second stripe comprises a stack of alternating metal and dielectric layers having a second set of thicknesses to provide a zero refractive index contrast at the first wavelength.

17. The diffraction grating of claim 14, wherein a ratio of the first to second pitches is equal to a ratio of the first to second wavelengths, such that in operation, components of an optical beam at the first and second wavelengths impinging on the diffraction grating are diffracted at a substantially same diffraction angle.

* * * * *